United States Patent [19]
Ikeda et al.

[11] Patent Number: 6,118,825
[45] Date of Patent: Sep. 12, 2000

[54] DIGITAL DATA TRANSMISSION DEVICE AND METHOD, DIGITAL DATA DEMODULATION DEVICE AND METHOD, AND TRANSMISSION MEDIUM

[75] Inventors: Yasunari Ikeda, Kanagawa; Tamotsu Ikeda, Tokyo, both of Japan

[73] Assignee: Sony Corporation, Japan

[21] Appl. No.: 09/289,218

[22] Filed: Apr. 9, 1999

Related U.S. Application Data

[63] Continuation of application No. PCT/JP98/03579, Aug. 11, 1998.

[30] Foreign Application Priority Data

| Aug. 11, 1997 | [JP] | Japan | 9-216077 |
| Aug. 11, 1997 | [JP] | Japan | 9-216092 |
| Aug. 19, 1997 | [JP] | Japan | 9-222810 |
| Aug. 22, 1997 | [JP] | Japan | 9-226056 |
| Sep. 4, 1997 | [JP] | Japan | 9-239771 |

[51] Int. Cl.[7] .............................. H04L 27/00; H03D 1/00
[52] U.S. Cl. .......................................... 375/259; 375/341
[58] Field of Search .................. 375/259, 202, 375/308, 341, 340; 714/786, 784, 774, 789, 788, 794, 795

[56] References Cited

U.S. PATENT DOCUMENTS

| 4,312,070 | 1/1982 | Coombes et al. | 371/40 |
| 5,229,997 | 7/1993 | Hirata et al. | 370/104.1 |
| 5,506,903 | 4/1996 | Yamashita | 380/19 |
| 5,870,390 | 2/1999 | Campanella | 370/326 |
| 5,933,462 | 8/1999 | Viterbi et al. | 375/341 |

FOREIGN PATENT DOCUMENTS

| 61-3529 | 1/1986 | Japan . |
| 3-32117 | 2/1991 | Japan . |
| 6-260945 | 9/1994 | Japan . |
| 7-226688 | 8/1995 | Japan . |
| 7-254861 | 10/1995 | Japan . |

OTHER PUBLICATIONS

Takeshi Kimura, et al., An Application of MPEG–2 Systems to ISDB Transport System, ITE Technical Report, vol. 18, No. 28, pp. 7–12 (May, 1994).

H. Katoh, et al., A Flexible Transmission Technique For The Satellite ISDB System, IEEE Transactions On Broadcasting, vol. 42, No. 3, pp. 159–166 (Sep. 1996).

Akinori Hashimoto, et al., A Demonstrative Experiment of BS Digital Broadcasting Transmission Systems, Technical Report of IEICE, vol. 97, No. 555, pp. 35–39 (Feb. 1998).

*Primary Examiner*—Chi H. Pham
*Assistant Examiner*—Khai Tran
*Attorney, Agent, or Firm*—Lerner, David, Littenberg, Krumholz & Mentlik, LLP

[57] ABSTRACT

Frame synchronizing signals held by a synchronization register are Reed-Solomon-coded by a Reed-Solomon coding circuit, then interleaved by an interleave circuit, then convolutional-coded by a convolutional coding circuit, then mapped by a mapping circuit, and then outputted. Thus, the frame synchronizing signals can be stably and quickly detected.

43 Claims, 25 Drawing Sheets

| TIMING | SHIFT REGISTER61 | SHIFT REGISTER62 | SHIFT REGISTER63 | SHIFT REGISTER64 | SHIFT REGISTER65 | SHIFT REGISTER66 | OUTPUT |
|---|---|---|---|---|---|---|---|
| t1 | FRAME SYNC 1ST BIT | E | D | C | B | A | UNDEFINED |
| t2 | FRAME SYNC 2ND BIT | FRAME SYNC 1ST BIT | E | D | C | B | UNDEFINED |
| t3 | FRAME SYNC 3RD BIT | FRAME SYNC 2ND BIT | FRAME SYNC 1ST BIT | E | D | C | UNDEFINED |
| t4 | FRAME SYNC 4TH BIT | FRAME SYNC 3RD BIT | FRAME SYNC 2ND BIT | FRAME SYNC 1ST BIT | E | D | UNDEFINED |
| t5 | FRAME SYNC 5TH BIT | FRAME SYNC 4TH BIT | FRAME SYNC 3RD BIT | FRAME SYNC 2ND BIT | FRAME SYNC 1ST BIT | E | UNDEFINED |
| t6 | FRAME SYNC 6TH BIT | FRAME SYNC 5TH BIT | FRAME SYNC 4TH BIT | FRAME SYNC 3RD BIT | FRAME SYNC 2ND BIT | FRAME SYNC 1ST BIT | UNIQUE |
| t7 | FRAME SYNC 7TH BIT | FRAME SYNC 6TH BIT | FRAME SYNC 5TH BIT | FRAME SYNC 4TH BIT | FRAME SYNC 3RD BIT | FRAME SYNC 2ND BIT | UNIQUE |
| ... | | | | | | | |
| t14 | FRAME SYNC 14TH BIT | FRAME SYNC 13TH BIT | FRAME SYNC 12TH BIT | FRAME SYNC 11TH BIT | FRAME SYNC 10TH BIT | FRAME SYNC 9TH BIT | UNIQUE |
| t15 | FRAME SYNC 15TH BIT | FRAME SYNC 14TH BIT | FRAME SYNC 13TH BIT | FRAME SYNC 12TH BIT | FRAME SYNC 11TH BIT | FRAME SYNC 10TH BIT | UNIQUE |
| t16 | FRAME SYNC 16TH BIT | FRAME SYNC 15TH BIT | FRAME SYNC 14TH BIT | FRAME SYNC 13TH BIT | FRAME SYNC 12TH BIT | FRAME SYNC 11TH BIT | UNDEFINED |
| t17 | a | FRAME SYNC 16TH BIT | FRAME SYNC 15TH BIT | FRAME SYNC 14TH BIT | FRAME SYNC 13TH BIT | FRAME SYNC 12TH BIT | UNDEFINED |
| t18 | b | a | FRAME SYNC 16TH BIT | FRAME SYNC 15TH BIT | FRAME SYNC 14TH BIT | FRAME SYNC 13TH BIT | UNDEFINED |
| ... | | | | | | | |

FIG.13

DIGITAL DATA TRANSMISSION DEVICE AND METHOD, DIGITAL DATA DEMODULATION DEVICE AND METHOD, AND TRANSMISSION MEDIUM

CROSS-REFERENCE TO RELATED APPLICATIONS

This is a continuation of International Application No. PCT/JP98/03579 filed on Aug. 11, 1998.

FIELD OF THE INVENTION

This invention relates to a digital data transmission device and method, a digital data demodulation device and method, and a transmission medium, and more particularly to a digital data transmission device and method, a digital data demodulation device and method, and a transmission medium which realize stable frame synchronization by convolutional-coding a frame synchronizing signal.

BACKGROUND OF THE INVENTION

Digital multi-channel broadcast using the communication satellite (hereinafter referred to as CS) has been practically started and various services have been provided. Also, it is considered to provide digital broadcasting services using the broadcasting satellite (hereinafter referred to as BS) from now on.

Since the BS uses greater power than the CS, it is conventionally considered to use a modulation system having a higher transmission efficiency than a QPSK modulation system used for the CS. In addition, as a bit stream to be transmitted, it is proposed to basically employ a so-called transport stream (hereinafter referred to as TS) prescribed by the MPEG2 systems, in view of realization of consistency with other media such as the CS, ground waves and cables. This TS is constituted by a TS packet consisting of 188 bytes including one-byte sync byte, whereas a Reed-Solomon code (hereinafter referred to as RS code) obtained by appending 16-byte parities for error correction is used for CS digital multi-channel broadcast, ground wave digital broadcast, and cable digital broadcast. Therefore, for BS digital broadcast, too, it is proposed to carry out RS (204, 188) coding with respect to the TS.

In the BS digital broadcast, there is proposed a system for using a convolutional-coded BPSK (binary phase shift keying) signal or QPSK (quadrature phase shift keying) signal, or a Trellis-coded 8PSK (phase shift keying) (hereinafter referred to as TC 8PSK), as a main signal portion for transmitting payload information from which a synchronizing portion of the RS (204,188)-coded TS packet is removed, and transmitting transmission information such as the modulation system and the coding rate with BPSK by using the synchronizing portion of the TS packet.

Particularly, if so-called pragmatic TC 8PSK is used as the TC 8PSK, a coding circuit and a decoding circuit similar to those used for conventional convolutional coding can be used. Therefore, in the case where signals of BPSK, QPSK, 8PSK for transmitting payload information are to be demodulated by a receiving device, the same Viterbi decoder can be used for demodulating any of these signals. This is advantageous for the hardware structure.

FIG. 1 shows an exemplary structure of a transmission device for such BS digital broadcast which is currently proposed. To a TS packet consisting of 188 bytes, 16-byte parities are appended by RS (204, 188) coding. 48 of such packets are collected to form one frame.

One-byte sync bytes at the leading ends of the 48 packets of each frame are sequentially and continuously read out, and inputted to a frame synchronization and TMCC generation circuit 81. The frame synchronization and TMCC generation circuit 81 replaces the sync bytes of the first two TS packets by frame synchronizing signals. Also, the frame synchronization and TMCC generation circuit 81 replaces the sync bytes of the third and subsequent TS packets by TMCC (transmission multiplexing configuration control) signals. The TMCC signal includes transmission control information such as the modulation system and the coding rate of the main signals as will be later described. Thus, the two sync bytes of the first two packets of the 48 packets constituting one frame are replaced by frame synchronizing signals, and the sync bytes of the third and subsequent packets are replaced by TMCC signals. The frame synchronizing signals and the TMCC signals generated by the frame synchronization and TMCC generation circuit 81 are inputted to a BPSK mapping circuit 82, and mapped to predetermined signal points.

The main signals of the first two TS packets of one frame are low-hierarchy image signals LQ. These signals are interleaved by an interleave circuit 83 within the range of these two TS packets. The interleaved signals are inputted to a convolutional coding circuit 84 and convolutional-coded at a coding rate of ½. The convolutional-coded signals are processed by puncturing to a coding rate of ¾, and supplied to a QPSK mapping circuit 85. The signals are mapped to predetermined signal points in the QPSK system by the QPSK mapping circuit 85.

On the other hand, the main signals of the remaining 46 TS packets, of the 48 packets constituting one frame, are high-hierarchy image signals HQ. These signals are inputted to and interleaved by an interleave circuit 86, and then coded by a ⅔ trellis coding circuit 87. Then, the signals are mapped to signals points by an 8PSK mapping circuit 88. As so-called pragmatic trellis coding is carried out by the ⅔ trellis coding circuit 87, the convolutional coding circuit 84 and the ⅔ trellis coding circuit 87 can be a common circuit.

A multiplexing circuit 89 multiplexes outputs of the BPSK mapping circuit 82, the QPSK mapping circuit 85 and the 8PSK mapping circuit 88 for each frame, and outputs the multiplexed signals. Thus, the signals of each frame outputted from the multiplexing circuit 89 has such a format that the BPSK-modulated frame synchronizing signals and TMCC signals, the QPSK-modulated low-hierarchy main signals LQ, and the 8PSK-modulated high-hierarchy main signals HQ are arranged in this order.

On the receiving side, after synchronization of carrier waves and clocks is established, the BPSK-modulated frame synchronizing signals are detected by monitoring received signal series, and frame synchronization is established. Since the frame synchronizing signals are followed by the BPSK-modulated TMCC signals, the TMCC signals can be obtained by receiving and demodulating the signals following the frame synchronizing signals when frame synchronization is established. By interpreting the contents of the TMCC signals, the transmission control information such as the modulation system and the coding rate of symbols of the main signals for transmitting payload information, which is transmitted subsequently to the TMCC signals, can be known. Therefore, receiving of the main signals and decoding of inner codes can be carried out on the basis of the transmission control information.

After that, the frame synchronizing signals and the TMCC signals in the demodulated signals are replaced by synchronizing signals of TS, as in the original form. Thus, the RS (204,188)-coded TS consisting of one-byte synchronizing signal and 203-byte main signals is restored. By decoding the RS code, the originally transmitted TS can be obtained.

FIG. 2 shows an example of such synchronization processing. First, at step S1, detection of a first frame synchronizing signal is waited for. When the first frame synchronizing signal is detected, the processing goes to step S2, where it is discriminated whether a second frame synchronizing signal is detected or not. If the second frame synchronizing signal is detected, the processing goes to step S3, where it is discriminated whether a third frame synchronizing signal is detected or not. If the third frame synchronizing signal is detected, the processing goes to step S4, where it is discriminated whether a fourth frame synchronizing signal is detected or not. In this manner, if the frame synchronizing signals with respect to four frames are continuously detected, it is assumed at step S5 that frame synchronization is established, and frame synchronization establishment processing is carried out.

If it is discriminated at step S2 that the second frame synchronizing signal is not detected after the first frame synchronizing signal is detected, the processing goes to step S6, where it is discriminated whether a third frame synchronizing signal is detected or not. If it is discriminated that the third frame synchronizing signal is detected, the processing goes to step S7 and it is discriminated whether a fourth frame synchronizing signal is detected or not. If the fourth frame synchronizing signal is detected, the processing goes to step S8 and it is discriminated whether a fifth frame synchronizing signal is detected or not. In this manner, even though the second frame synchronizing signal is not detected after the first frame synchronizing signal is detected, if the frame synchronizing signal is continuously detected three times, the processing goes to step S5 and frame synchronization establishment processing is carried out.

If it is discriminated at step S6 that the frame synchronizing signal is not continuously detected twice after the first frame synchronizing signal is detected, the processing returns to step S1 and the subsequent processing is repeated.

If the third frame synchronizing signal is detected through the second frame synchronizing signal is not detected after the first frame synchronizing signal is detected, and then if it is discriminated at step S7 that the fourth frame synchronizing signal is not detected, the processing goes to step S9 and it is discriminated whether a fifth frame synchronizing signal is detected or not. Then, if it is discriminated that the fifth frame synchronizing signal is detected, the processing goes to step S10 and it is discriminated whether a sixth frame synchronizing signal is detected or not. If it is discriminated that the sixth frame synchronizing signal is detected, the processing goes to step S5 and frame synchronization establishment processing is carried out. If it is discriminated at step S9 or S10 that the frame synchronizing signal is not detected, the processing returns to step S1 and the subsequent processing is repeated.

If it is discriminated at step S3 that the third frame synchronizing signal is not detected after it is discriminated that frame synchronizing signal is continuously detected twice, the processing goes to step S7 and the subsequent processing is carried out. If it is discriminated at step S4 that the fourth frame synchronizing signal is not detected after it is discriminated that the frame synchronizing signal is continuously detected three times, the processing goes to step S8 and the subsequent processing is carried out.

If it is discriminated at step S5 that the fifth frame synchronizing signal is not detected, the processing goes to step S10 and the subsequent processing is carried out.

Thus, in the state where frame synchronization is established, the TMCC signals and the main signals can be accurately demodulated with reference to the frame synchronizing signals.

The foregoing processing up to establishment of frame synchronization is referred to as backward alignment guard.

If it is discriminated that frame synchronization is established by the foregoing backward alignment guard, it is confirmed at step S11 whether a frame synchronizing signal is continually detected or not. If it is discriminated at step S11 that a frame synchronizing signal (n-th) is not detected in a predetermined frame, the processing goes to step S12 and it is discriminated whether an (n+1)th frame synchronizing signal is detected or not. If it is discriminated at step S12 that the (n+1)th frame synchronizing signal is not detected, it is discriminated at step S13 whether an (n+2)th frame synchronizing signal is detected or not. If not, it is discriminated at step S14 whether an (n+3)th frame synchronizing signal is detected or not. In this manner, if discrimination to the effect that the frame synchronizing signal is not detected occurs continuously for four frames, the processing goes to step S15. Then, on the assumption of pulling out of frame synchronism, pull out processing is carried out. After that, the processing returns to step S1 and the subsequent processing is carried out.

If it is discriminated at step S12 that the (n+1)th frame synchronizing signal is detected after it is discriminated that the n-th frame synchronizing signal is not detected, the processing goes to step S16 and it is discriminated whether an (n+2)th frame synchronizing signal is detected or not. If the (n+2)th frame synchronizing signal is detected, the frame synchronizing signal cannot be detected only for one frame. Therefore, the processing returns to step S11 and the subsequent processing is carried out.

If it is discriminated at step S16 that the (n+2)th frame synchronizing signal is not detected, it is discriminated at step S17 whether an (n+3)th frame synchronizing signal is detected or not. If it is discriminated that the (n+3)th frame synchronizing signal is not detected, it is discriminated at step S18 whether an (n+4)th frame synchronizing signal is detected or not. If it is discriminated that the (n+4)th frame synchronizing signal is not detected, discrimination to the effect that the frame synchronizing signal is not detected has occurred continuously three times. Therefore, the processing goes to step S15 and pull out processing is carried out.

If it is discriminated at step S17 that the (n+3)th frame synchronizing signal is detected, the processing goes to step S19 and it is discriminated whether an (n+4)th frame synchronizing signal is detected or not. If it is discriminated that the (n+4)th frame synchronizing signal is not detected, the processing goes to step S20 and it is discriminated whether an (n+5)th frame synchronizing signal is detected or not. If it is discriminated that the (n+5)th frame synchronizing signal is not detected, the processing goes to step S15 and pull out processing is carried out.

If it is discriminated at step S19 or S20 that the frame synchronizing signal is detected, the processing returns to step S11.

If it is discriminated at step S13 that the (n+2)th frame synchronizing signal is detected after discrimination to the effect that the frame synchronizing signal is not detected occurs continuously twice, the processing goes to step S17 and the subsequent processing is carried out. If it is discriminated at step S14 that the (n+3)th frame synchronizing signal is detected after discrimination to the effect that the frame synchronizing signal is not detected occurs continuously three times, the processing goes to step S18 and the subsequent processing is carried out.

If it is discriminated at step S18 that the (n+4)th frame synchronizing signal is detected, the processing goes to step S20 and the subsequent processing is carried out. The guard operation after establishment of frame synchronization up to detection of pulling out of frame synchronism is referred to as forward alignment guard.

Thus, the TS packet consisting of 188 bytes is processed by RS (204,188) coding, and convolutional coding and trellis coding are carried out as inner codes, so that correction of a transmission line error can be carried out. On the other hand, TMCC signals are required to have a higher durability to the transmission line error than the main signals, in order to transmit the transmission control information to the receiving side. The system proposed above meets this requirement by using BPSK, which is the most advantageous modulation system with respect to the transmission line error, from among various modulation systems.

However, BPSK modulation alone cannot provide a sufficient error durability, and more effective error correction processing is required with respect to the TMCC signals.

Also, no measures for error correction are taken with respect to the frame synchronizing signals. On the side of the receiving unit, only synchronization guard processing by a state machine circuit as described with reference to FIG. 2 is carried out.

Therefore, particularly in the case where C/N is low, it is difficult to detect the frame synchronizing signals stably and at a high speed.

SUMMARY OF THE INVENTION

In view of the foregoing status of the art, it is an object of the present invention to improve the durability against transmission line error. It is another object of the present invention to enable stable and quick detection of frame synchronizing signals.

A digital data transmission device according to the present invention includes: generation means for generating a frame synchronizing signal of a frame; supply means for supplying a main signal to be transmitted in the frame; and convolutional coding means for convolutional-coding the frame synchronizing signal and the main signal.

A digital data transmission method according to the present invention includes: a generation step of generating a frame synchronizing signal of a frame; a supply step of supplying a main signal to be transmitted in the frame; and a convolutional coding step of convolutional-coding the frame synchronizing signal and the main signal.

A transmission medium according to the present invention transmits a program, the program including: a generation step of generating a frame synchronizing signal of a frame; a supply step of supplying a main signal to be transmitted in the frame; and a convolutional coding step of convolutional-coding the frame synchronizing signal and the main signal.

A digital data demodulation device according to the present invention includes: decoding means for convolutional-decoding a main signal and a frame synchronizing signal which are transmitted thereto; and synchronization detection means for detecting the frame synchronizing signal from the transmitted signals before convolutional decoding by the decoding means.

A digital data demodulation method according to the present invention includes: a decoding step of convolutional-decoding a main signal and a frame synchronizing signal which are transmitted; and a synchronization detection step of detecting the frame synchronizing signal from the transmitted signals before convolutional decoding at the decoding step.

A transmission medium according to the present invention transmits a program, the program including: a decoding step of convolutional-decoding a main signal and a frame synchronizing signal which are transmitted; and a synchronization detection step of detecting the frame synchronizing signal from the transmitted signals before convolutional decoding at the decoding step.

A digital data transmission device according to the present invention includes: supply means for supplying a main signal; transmission control signal generation means for generating a transmission control signal; specified pattern signal generation means for generating a specified pattern of signal; multiplexing means for multiplexing the specified pattern of signal to the forward side and the back side of the transmission control signal; convolutional coding means for convolutional-coding the main signal, the transmission control signal, and the specified pattern of signal; first modulation means for modulating the main signal by a first system; and second modulation means for modulating the transmission control signal and the specified pattern of signal by a second system.

A digital data transmission method according to the present invention includes: a supply step of supplying a main signal; a transmission control signal generation step of generating a transmission control signal; a specified pattern signal generation step of generating a specified pattern of signal; a multiplexing step of multiplexing the specified pattern of signal to the forward side and the back side of the transmission control signal; a convolutional coding step of convolutional-coding the main signal, the transmission control signal, and the specified pattern of signal; a first modulation step of modulating the main signal by a first system; and a second modulation step of modulating the transmission control signal and the specified pattern of signal by a second system.

A transmission medium according to the present invention transmits a program, the program including: a supply step of supplying a main signal; a transmission control signal generation step of generating a transmission control signal; a specified pattern signal generation step of generating a specified pattern of signal; a multiplexing step of multiplexing the specified pattern of signal to the forward side and the back side of the transmission control signal; a convolutional coding step of convolutional-coding the main signal, the transmission control signal, and the specified pattern of signal; a first modulation step of modulating the main signal by a first system; and a second modulation step of modulating the transmission control signal and the specified pattern of signal by a second system.

A digital data demodulation device according to the present invention includes: demodulation means for demodulating a main signal transmitted thereto by a first system and demodulating a transmission control signal and a specified pattern of signal which are transmitted thereto by a second system; and decoding means for Viterbi-decoding the main signal, the transmission control signal and the specified pattern of signal which are demodulated.

A digital data demodulation method according to the present invention includes: a demodulation step of demodulating a transmitted main signal by a first system and demodulating a transmission control signal and a specified pattern of signal which are transmitted by a second system; and decoding means for Viterbi-decoding the main signal, the transmission control signal and the specified pattern of signal which are demodulated.

A transmission medium according to the present invention transmits a program, the program including: a demodulation step of demodulating a transmitted main signal by a first system and demodulating a transmission control signal and a specified pattern of signal which are transmitted by a second system; and decoding means for Viterbi-decoding the main signal, the transmission control signal and the specified pattern of signal which are demodulated.

In the digital data transmission device, the digital data transmission method, and the transmission medium according to the present invention, a frame synchronizing signal is convolutional-coded together with a main signal.

In the digital data demodulation device, the digital data demodulation method, and the transmission medium according to the present invention, a main signal and a frame synchronizing signal are convolutional-decoded. The frame synchronizing signal is detected from the signals before convolutional decoding.

In the digital data transmission device, the digital data transmission method, and the transmission medium according to the present invention, a specified pattern of signal is multiplexed to the forward side and the back side of a transmission control signal. The main signal, the transmission control signal, and the specified pattern of signal are convolutional-coded. The main signal is modulated by a first system, and the transmission control signal and the specified pattern of signal are modulated by a second system.

In the digital data demodulation device, the digital data demodulation method, and the transmission medium according to the present invention, a transmitted main signal is demodulated by a first system, and a transmission control signal and a specified pattern of signal are demodulated by a second system. The main signal, the transmission control signal, and the specified pattern of signal which are demodulated are Viterbi-decoded.

BRIEF DESCRIPTION OF THE DRAWINGS

FIG. 13 shows operation of a frame synchronization detection circuit 41 of FIG. 11.

DETAILED DESCRIPTION OF THE PREFERRED EMBODIMENTS

Preferred embodiments of the present invention will now be described with reference to the drawings.

Figure 3:
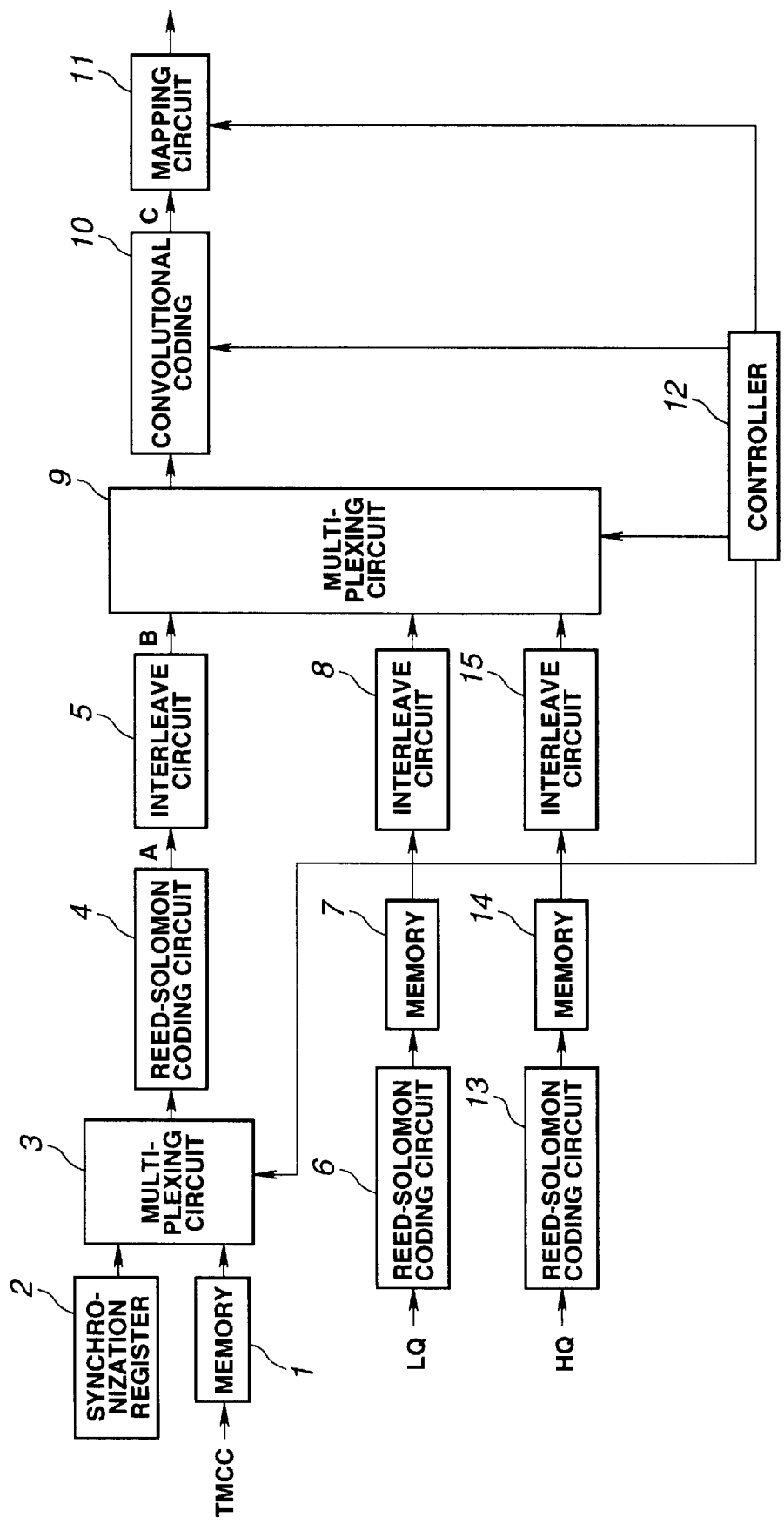
FIG. 3 is a block diagram showing an exemplary structure of a transmission device to which the present invention is applied.

FIG. 3 shows an exemplary structure of a transmission device to which the present invention is applied. In a memory 1, TMCC signals including transmission control information are stored. In a synchronization register 2, frame synchronizing signals are stored. A multiplexing circuit 3 reads out the frame synchronizing signals from the synchronization register 2 or the TMCC signals from the memory 1 at predetermined timing as will be later described, then multiplexes the read-out signals, and outputs the multiplexed signals to a Reed-Solomon coding circuit 4.

The Reed-Solomon coding circuit 4 carries out RS (48, 38) coding of the frame synchronizing signals and the TMCC signals inputted from the multiplexing circuit 3, and outputs the resultant signals to an interleave circuit 5. The interleave circuit 5 interleaves the signals inputted from the Reed-Solomon coding circuit 4, and then outputs the interleaved signals to a multiplexing circuit 9. The interleave circuit 5 is adapted for dispersing an error in a convolutional coding circuit 10 on the subsequent stage so that RS decoding is carried out on the receiving side, thus improving the error correction capability.

Meanwhile, a TS including main signals of low-hierarchy image signals LQ and a TS including main signals of high-hierarchy image signals HQ are inputted to Reed-Solomon coding circuits 6 and 13, respectively. The Reed-Solomon coding circuits 6 and 13 carry out Reed-Solomon coding of the TS and output the resultant TS to memories 7 and 14, respectively, where the TS are stored. At this point, sync bytes of the TS are not written in the memories 7, 14. The TS read out from the memories 7, 14 are interleaved by interleave circuits 8, 15 and then inputted to the multiplexing circuit 9.

The multiplexing circuit 9 multiplexes the frame synchronizing signals and the TMCC signals inputted from the interleave circuit 5, to the main signals inputted from the interleave circuit 8, 15 so as to form a frame, and outputs the frame. The frame structure is similar to that of FIG. 1, in which the frame synchronizing signals and the TMCC signals are arranged first, followed by the low-hierarchy main signals LQ and finally by the high-hierarchy main signals HQ.

The convolutional coding circuit 10 carries out convolutional coding adapted for the respective signals in the frame supplied from the multiplexing circuit 9, as will be later described, and outputs the resultant signals to a mapping circuit 11. The mapping circuit 11 carries out processing for mapping the multiplexed signals supplied from the convolutional coding circuit 10 to signal points of a modulation system such as BPSK modulation, QPSK modulation or 8PSK modulation, in accordance with the respective signals.

Figure 4:
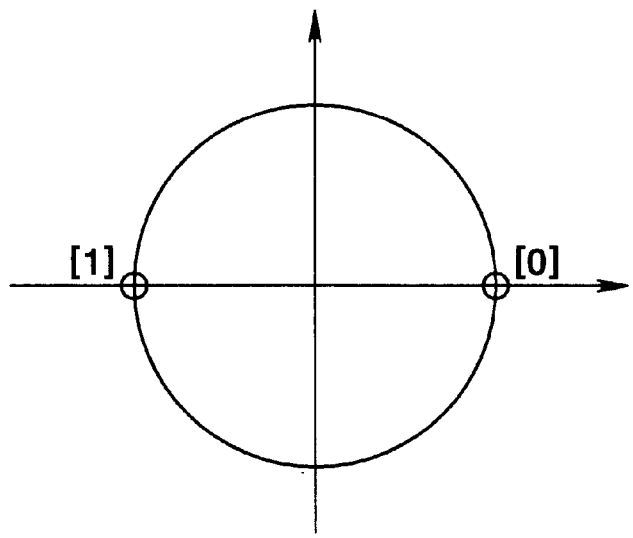
FIG. 4 illustrates symbol mapping of the BPSK modulation system.
Figure 5:
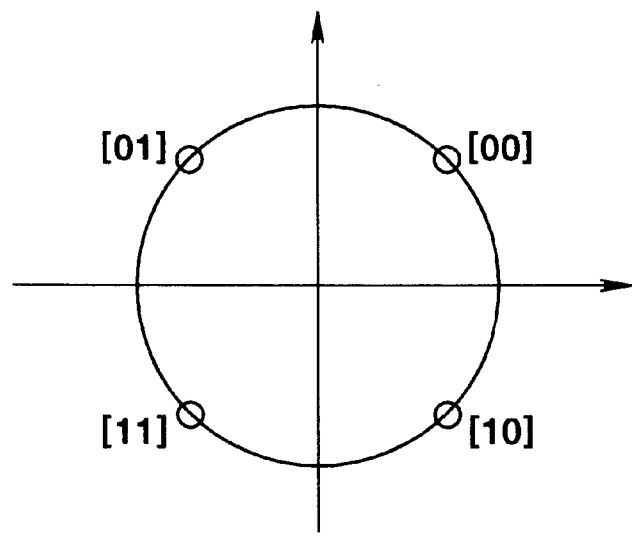
FIG. 5 illustrates symbol mapping of the QPSK modulation system.
Figure 6:
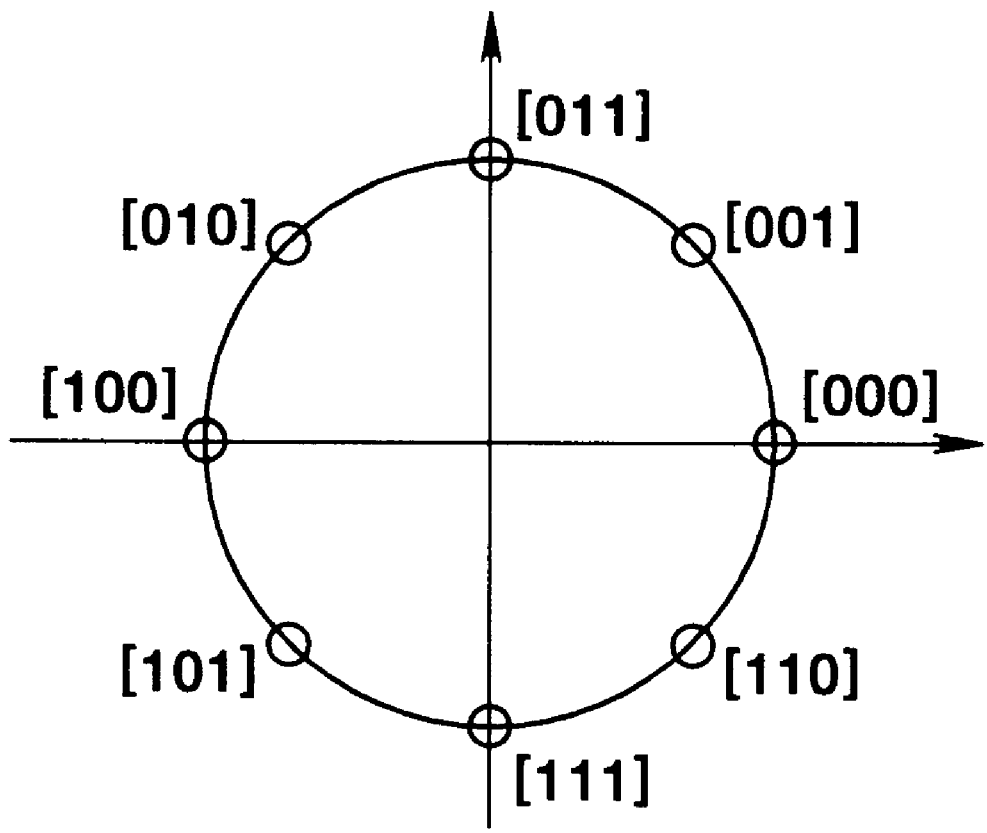
FIG. 6 illustrates symbol mapping of the BPSK modulation system.

FIGS. 4 to 6 show mapping of signal points. FIG. 4 shows the signal points of mapping in the BPSK modulation system. FIG. 5 shows the signal points of mapping in the QPSK modulation system. FIG. 6 shows the signal points of mapping in the 8PSK modulation system. In the case of the BPSK modulation system, as shown in FIG. 4, mapping to two signal points having a phase difference of 180 degrees is carried out. In the case of the QPSK modulation system, as shown in FIG. 5, mapping to four signal points having a phase difference of 90 degrees each is carried out. In the case of the 8PSK modulation system, as shown in FIG. 6, mapping to eight signal points having a phase difference of 45 degrees each is carried out.

A controller 12 controls the operation of the multiplexing circuit 3, the multiplexing circuit 9, the convolutional coding circuit 10, and the mapping circuit 11.

Figure 7:
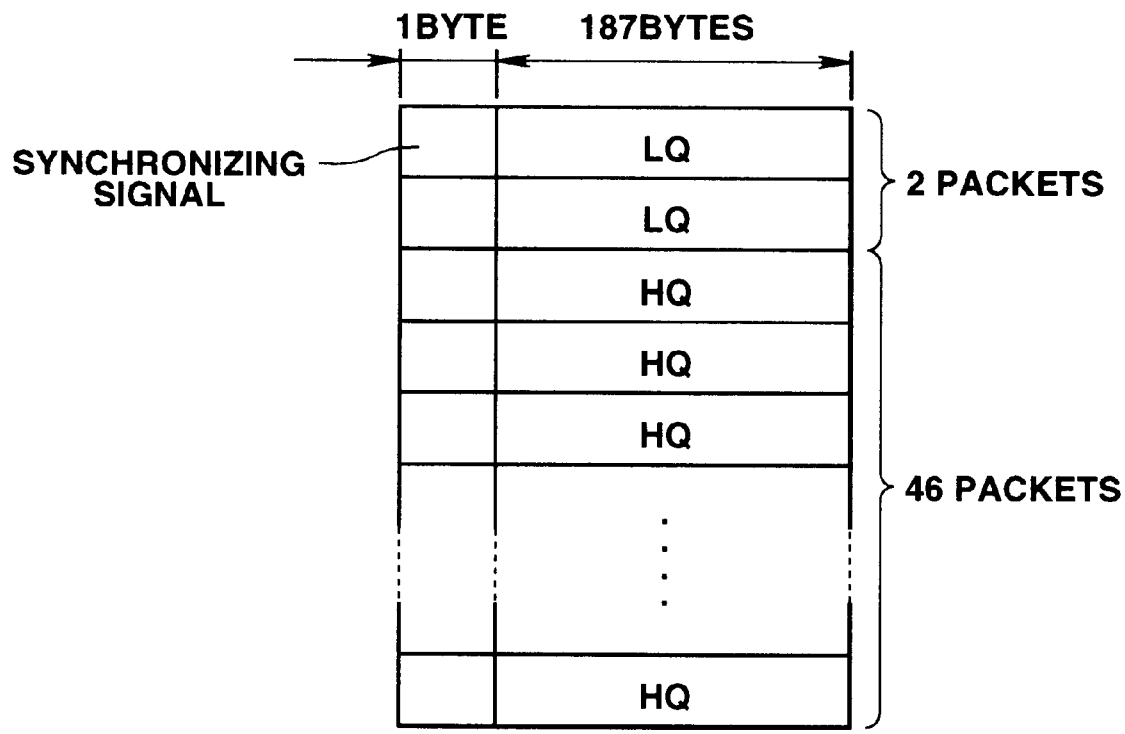
FIG. 7 illustrates packets of a transport stream.

The operation will be described hereinafter. The signals inputted to the Reed-Solomon coding circuits 6 and 13 are made of TS packets, each consisting of leading one byte as a synchronizing signal and subsequent 187 bytes as image data, as shown in FIG. 7. The image data is low-hierarchy image data LQ or high-hierarchy image data HQ. The low-hierarchy image data LQ is image data necessary for reproducing an image of the lowest definition, and the high-hierarchy image data HQ is image data necessary for reproducing an image of a high resolution. The Reed-Solomon coding circuit 6 is supplied with the low-hierarchy image data LQ of two packets for one frame, and the Reed-Solomon coding circuit 13 is supplied with the high-hierarchy image data HQ of 46 packets for one frame.

The Reed-Solomon coding circuits 6, 13 carry out RS (204,188) coding processing on each packet to add 16-byte parities, and supply the processed packets to the memories 7, 14, respectively, so that these packets are stored therein. At this point, however, the one-byte synchronizing signal of each packet is not written in the memories 7, 14. The image signals written in the memories 7, 14 are read out by the interleave circuits 8, 15, then processed by predetermined interleave processing, and supplied to the multiplexing circuit 9.

Meanwhile, the TMCC signals including transmission control information are supplied to and stored in the memory 1. Under the control of the controller 12, the multiplexing circuit 3 reads out the frame synchronizing signals stored in the synchronization register 2 and the TMCC signals stored in the memory 1 at predetermined timing, then multiplexes these signals, and outputs the multiplexed signals to the Reed-Solomon coding circuit 4. The frame synchronizing signals consist of two bytes. The multiplexing circuit 3 repeatedly carries out, for each frame, the processing for reading out the two-byte frame synchronizing signals, then reading out 10-byte TMCC signals from the memory 1, and outputting the signals to the Reed-Solomon coding circuit 4. That is, in this example, the two-byte frame synchronizing signals and the 10-byte TMCC signals are transmitted in one frame. The Reed-Solomon coding circuit 4 carries out RS (48,38) coding processing to add parities for one frame to data of three frames supplied from the multiplexing circuit 3.

Figure 1:
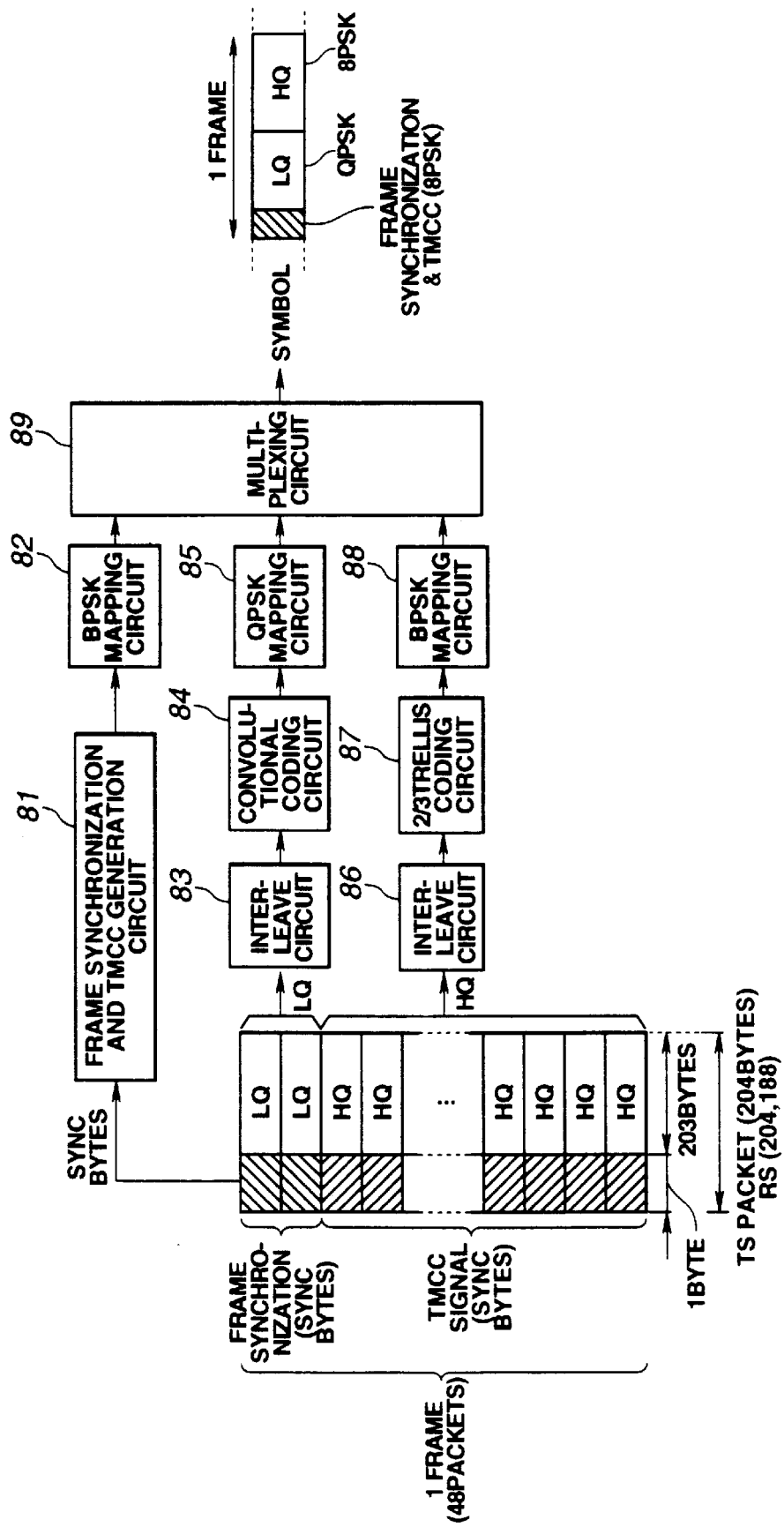
FIG. 1 is a block diagram showing an exemplary structure of a conventional transmission device.
Figure 2:
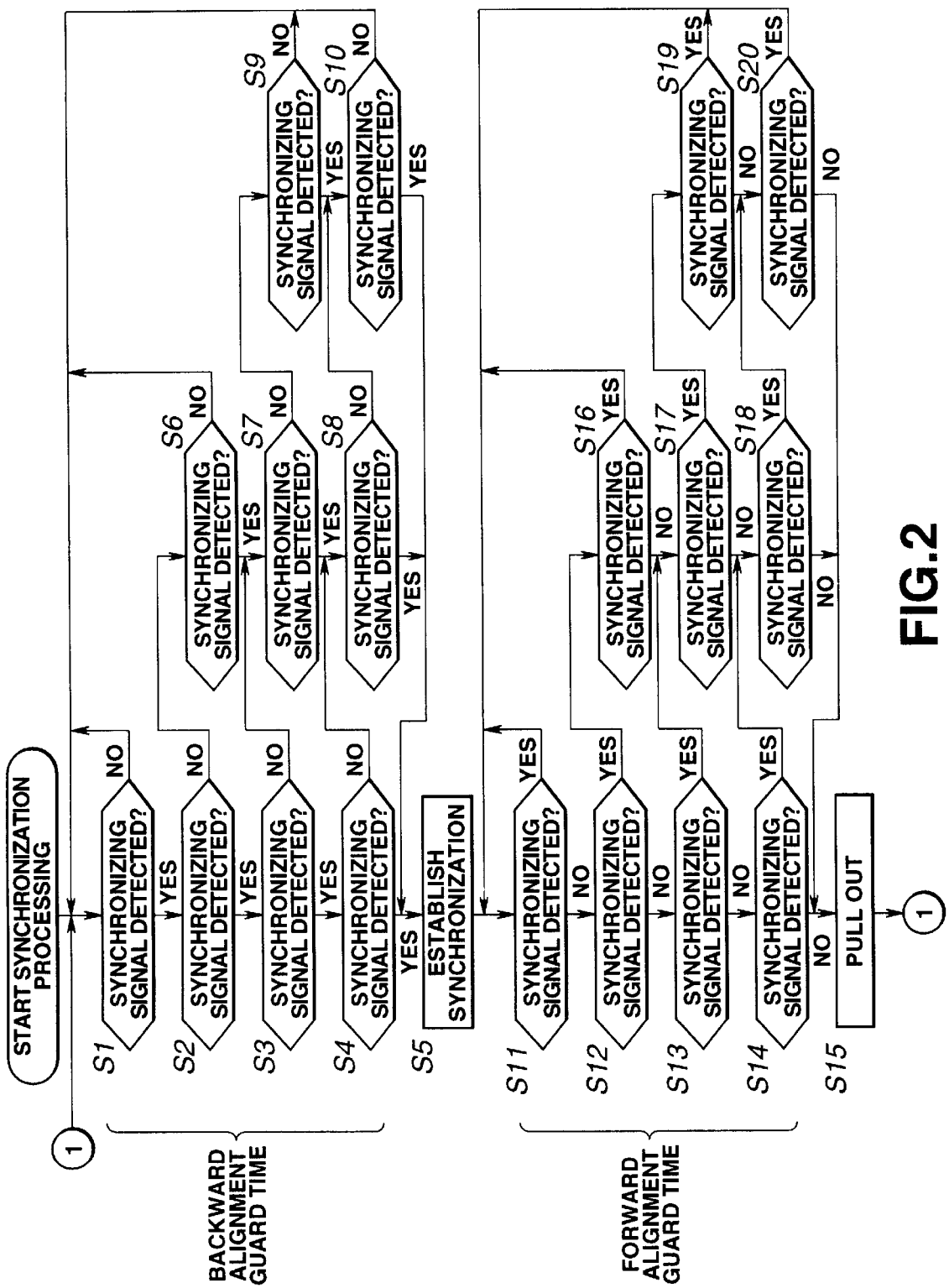
FIG. 2 is a flowchart for explaining synchronization processing of a conventional receiving device.

In the case of FIG. 1 as described above, 192 symbols (192 bits) of BPSK symbols per frame are allocated to the frame synchronizing signals and the TMCC signals. (The number of symbols per frame on the output stage of the BPSK mapping circuit 82 of FIG. 2 is 192.) The number of symbols per frame allocated to the frame synchronizing signals and the TMCC signals is not changed in the present embodiment. In short, since the convolutional coding circuit 10 carries out convolutional coding processing at a coding rate of ½ with respect to both the frame synchronizing signals and the TMCC signals, the quantity of information which can be allocated to the frame synchronizing signals and the TMCC signals per frame on the stage preceding the convolutional coding processing is 96 (=192/2) bits, that is, 12 bytes (two bytes for the frame synchronizing signals and 10 bytes for the TMCC signals as described above). The Reed-Solomon coding circuit 4 adds parities for one frame to data of three frames supplied from the multiplexing circuit 3, and carries out processing for forming Reed-Solomon codes with data of four frames in total (i.e., 48-byte data).

Specifically, the signals consisting of two-byte frame synchronizing signals and 10-byte TMCC signals are collected for three frames (for 36 bytes), and two-byte frame synchronizing signals of the fourth frame are added thereto to generate information of 38 (=36+2) bytes. With respect to this 38-byte information, 10-byte parities are appended and RS (48,38) coding is carried out. Thus, the output of the Reed-Solomon coding circuit 4 is as indicated by interleave A. As a result, the TMCC signals of 30 bytes (240 bits) can be transmitted in four frames.

In this example, Reed-Solomon coding is carried out both on the frame synchronizing signals and on the TMCC signals. It may also be considered to carry out Reed-Solomon coding only on the TMCC signals. In this case, RS (40,30) coding is carried out.

Figure 8A:
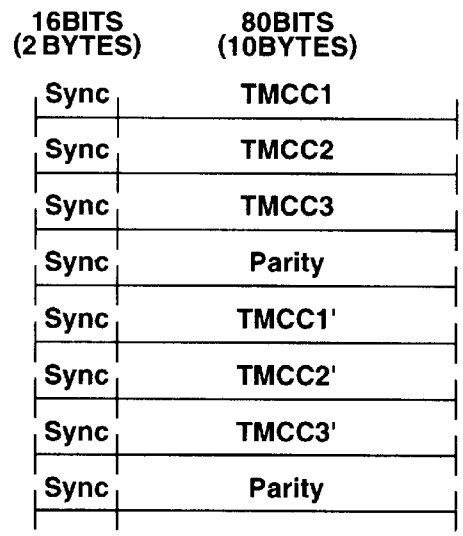
FIG. 8A shows data including TMCC signals supplied from a Reed-Solomon circuit 4.
Figure 8B:
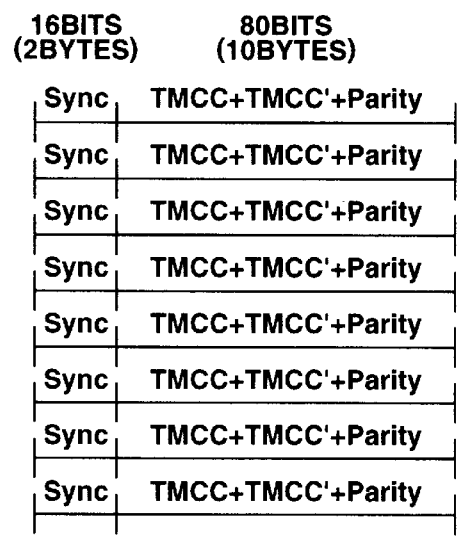
FIG. 8B shows data including TMCC signals interleaved by an interleave circuit 8.

The interleave circuit 5 carries out predetermined interleave processing with respect to the signals (FIG. 8A) supplied from the Reed-Solomon coding circuit 4, and outputs the interleaved signals to the multiplexing circuit 9. As for these signals, though the position of the two-byte synchronizing signals is not changed, the TMCC signals and the parities are interleaved to predetermined positions, as shown in FIG. 8B.

Figure 9:
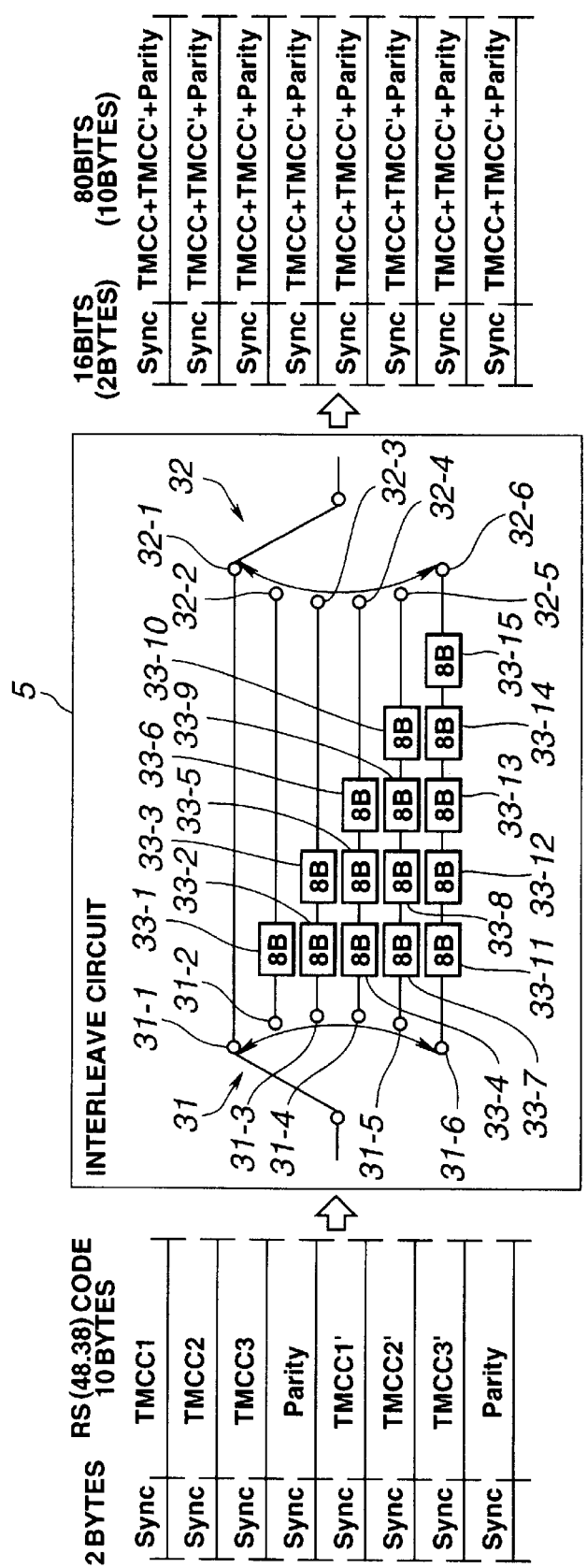
FIG. 9 shows a detailed structure of an interleave circuit 5 of FIG. 3.

FIG. 9 shows an exemplary structure of the interleave circuit 5. This interleave circuit 5 is of a convolutional type. In this example, inputted signals are inputted to any one of contacts 31-1 to 31-6 by a switch 31, and outputted from any one of contacts 32-1 to 32-6 by a switch 32. The contacts 31-1 and the contact 32-1 are directly connected with each other. A delay unit 33-1 is inserted between the contact 31-2 and the contact 32-2. Delay units 33-2 and 33-3 are inserted between the contact 31-3 and the contact 32-3. Delay units 33-4 to 33-6 are inserted between the contact 31-4 and the contact 324. Delay units 33-7 to 33-10 are inserted between the contact 31-5 and the contact 32-5. Delay units 33-11 to 33-15 are inserted between the contact 31-6 and the contact 32-6. Each delay unit provides a delay of eight bytes.

The switch 31 and the switch 32 are synchronously changed over to the corresponding contacts every two bytes.

At the timing when the two-byte frame synchronizing signals are inputted from the Reed-Solomon coding circuit 4, the switches 31 and 32 are changed overt to the uppermost contacts 31-1 and 32- 1, respectively, as shown in FIG. 9. Thus, the frame synchronizing signals are directly outputted without being delayed (interleaved).

On the other hand, when the 10-byte TMCC signals following the frame synchronizing signals are inputted, the switches 31 and 32 are sequentially changed over to the second contacts from the top, to the lowermost contacts in FIG. 9, every two bytes. As a result, the first two-byte signals of the 10-byte TMCC signals are delayed by one delay unit (eight bytes), and the second two-byte TMCC signals are delayed by two delay units (16 bytes). Similarly, the third to fifth two-byte TMCC signals are delayed by three delay units (24 bytes), four delay units (32 bytes), and five delay units (40 bytes), respectively. Then, the delayed signals are outputted.

The position of the frame synchronizing signals must not be changed by interleave processing of the interleave circuit 5. If the interleave circuit 5 is a convolutional-type interleave circuit, the position of the synchronizing signals can be easily saved and the circuit scale can be made smaller than that of a block-type interleave circuit.

If the switches 31, 32 of the interleave circuit 5 are changed over for each byte, burst-like errors can be dispersed more efficiently. In such case, however, the hardware structure is increased. Thus, in order to realize interleave processing with a smaller hardware structure without changing the position of the synchronizing signals, it is preferred to carry out interleave processing every two bytes.

Figure 10:
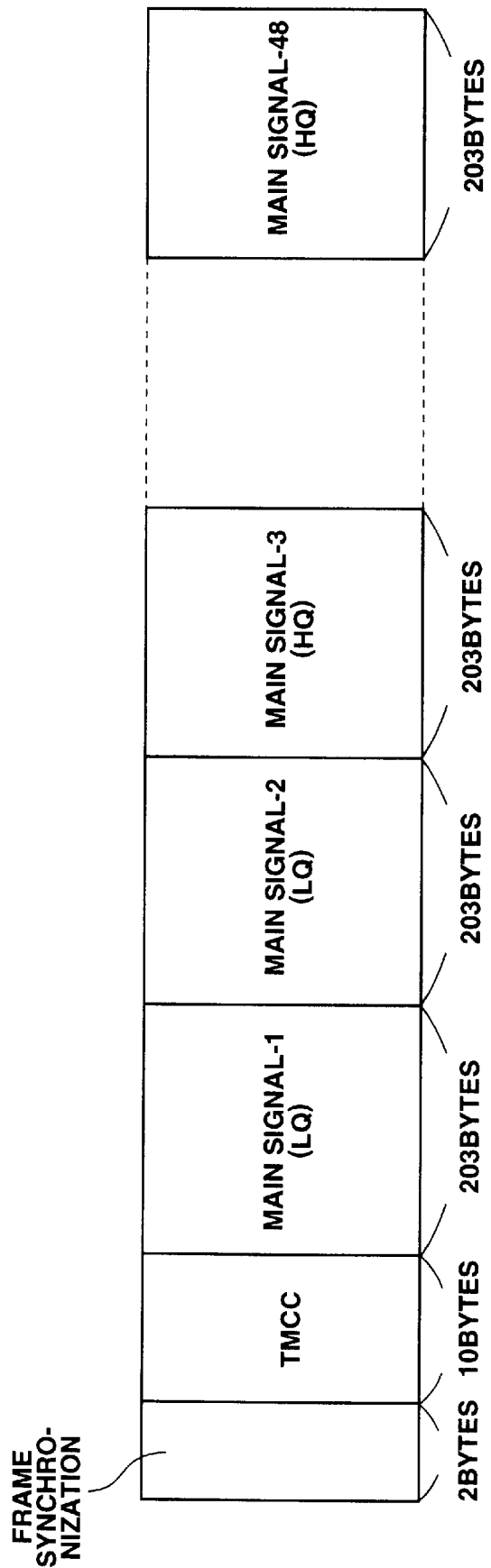
FIG. 10 illustrates the format of a signal obtained by multiplexing processing by a multiplexing circuit 9 of FIG. 3.

The multiplexing circuit 9 multiplexes the frame synchronizing signals and the TMCC signals supplied from the interleave circuit 5 to the leading ends of the main signals of one frame (48 packets) supplied from the interleave circuits 8 and 15, as shown in FIG. 10, and outputs the multiplexed signals to the convolutional coding circuit 10.

When the frame synchronizing signals or the TMCC signals are inputted from the multiplexing circuit 9, the convolutional coding circuit 10 under the control of the controller 12 carries out convolutional coding processing at a coding rate of ½ so as to transmit the frame synchronizing signals or the TMCC signals in the BPSK system at the coding rate of ½. If the main signals supplied from the multiplexing circuit 9 are the high-hierarchy image signals HQ, the convolutional coding circuit 10 carries out trellis coding of the main signals at a coding rate of ⅔. In this case, in transmission in the pragmatic TC 8PSK system, the input from the multiplexing circuit 9 is converted to two bits in parallel. One bit thereof is held as it is, and the other one bit is convolutional-coded at a coding rate of ½ to obtain codes of two bits. Thus, parallel outputs of three bits in total are outputted to the mapping circuit 11.

If the main signals are the low-hierarchy image signals LQ, the convolutional coding circuit 10 carries out convolutional coding at a coding rate of ½, then changes the coding rate to ¾ by puncturing processing so as to transmit the main signals in the QPSK system at the coding rate of ¾, and outputs the data to the mapping circuit 11.

Figure 11:
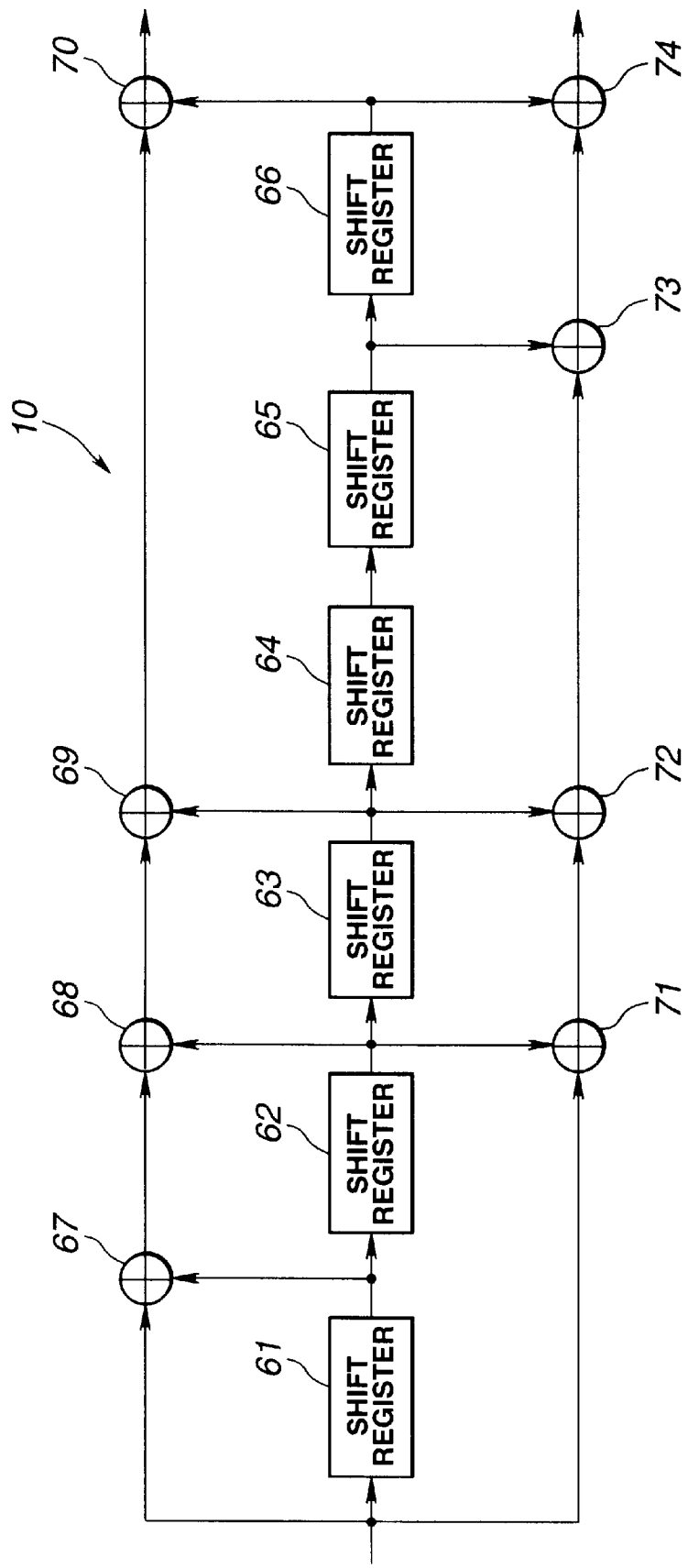
FIG. 11 is a block diagram showing an exemplary structure of the convolutional coding circuit 10 of FIG. 3.

FIG. 11 shows an exemplary structure of the convolutional coding circuit 10 in the case where the frame synchronizing signals and the TMCC signals are to be convolutional-coded. In this example, shift registers 61 to 66 sequentially output the data inputted from the multiplexing circuit 9, to the subsequent stage. An exclusive-OR circuit 67 calculates an exclusive OR of the input and output of the shift register 61. An exclusive-OR circuit 68 calculates an exclusive OR of the output of the exclusive-OR circuit 67 and the output of the shift register 62. An exclusive- OR circuit 69 calculates an exclusive OR Of the output of the exclusive-OR circuit 68 and the output of the shift register 63. An exclusive-OR circuit 70 calculates and outputs an exclusive OR of the output of the exclusive-OR circuit 69 and the output of the shift register 66.

An exclusive-OR circuit 71 calculates an exclusive OR of the input to the shift register 61 and the output of the shift register 62. An exclusive-OR circuit 72 calculates an exclusive OR of the output of the exclusive-OR circuit 71 and the output of the shift register 63. An exclusive-OR circuit 73 calculates the output of the exclusive-OR circuit 72 and the output of the shift register 65. An exclusive-OR circuit 74 calculates an exclusive OR Of the output of the exclusive-OR circuit 73 and the output of the shift register 66.

In this convolutional coding circuit 10, when the inputted data is sequentially transferred bit by bit to the subsequent stage by the shift registers 61 to 66, the exclusive ORs are calculated by the exclusive-OR circuits 67 to 74 at their respective timing. As a result, with respect to the input of one bit, data of two bits are outputted by the exclusive-OR circuits 70 and 74 (at a coding rate of ½).

On the assumption that the frame synchronizing signals consist of 16 bits, when the first six bits of 16 bits are held by the shift registers 61 to 66, the data of the seventh bit is inputted to the exclusive-OR circuits 67 and 71. Therefore, since the frame synchronizing signals are unique data and are not arbitrarily changed, the data outputted from the exclusive-OR circuits 70 and 74 at this point are uniquely defined. The data outputted from the exclusive-OR circuits 70 and 74 are uniquely defined, up to when the seventh last bit to the second last bit of the 16-bit frame synchronizing signals are held by the shift registers 61 to 66 while the last bit is inputted to the exclusive-OR circuits 67, 71.

The mapping circuit 11 under the control of the controller 12 maps the signal points as shown in FIG. 4 in the case where BPSK modulation is to be carried out (i.e., the frame synchronizing signals and the TMCC signals are inputted). The mapping circuit 11 also maps the signal points as shown in FIG. 5 in the case where QPSK modulation is to be carried out (i.e., the low-hierarchy image signals LQ are inputted). Also, the mapping circuit 11 maps the signal points as shown in FIG. 6 in the case where 8PSK modulation is to be carried out (i.e., the high-hierarchy image signals HQ are inputted).

Figure 8C:
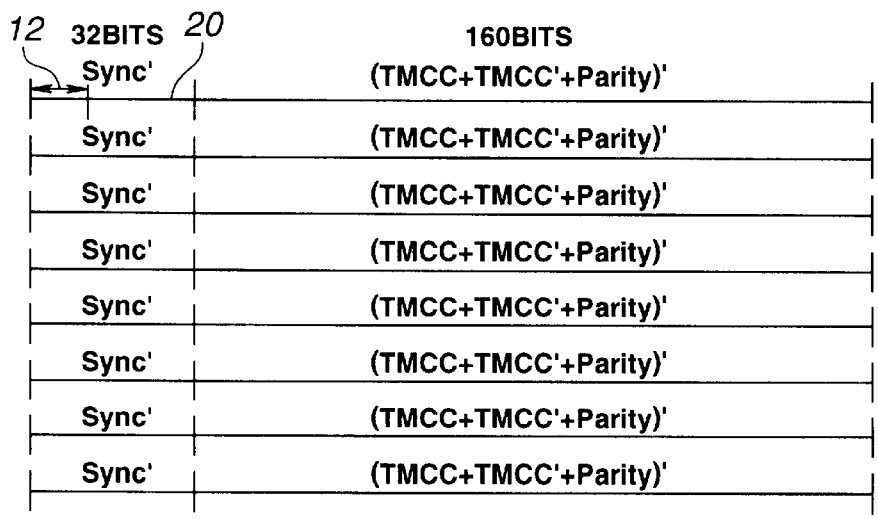
FIG. 8C shows data including TMCC signals convolutional-coded by a convolutional coding circuit 10.

As a result of convolutional coding by the convolutional coding circuit 10, the two-byte frame synchronizing signals and the 10-byte TMCC signals become 32-bit (four-byte) frame synchronizing signals and 160-bit (20-byte) TMCC signals, respectively, as shown in FIG. 8C. FIG. 8C shows the case where the convolutional code has a constraint length of 7 and a coding rate of ½.

By thus sufficiently dispersing the error by the interleave circuit 5 and modulating, in the BPSK modulation system, the TMCC signals on which sequential coding of the convolutional code and the RS code has been carried out, a higher durability against the transmission error can be provided.

Meanwhile, the contents of the transmission control signal for the main signals, included in the TMCC signals, are not frequently changed. However, in the receiving device, since the modulation system and the coding rate of the main signals can be known from the transmission control signal obtained by decoding the TMCC signals, the TMCC signals must be quickly received and demodulated at the time when the power is turned on or when the channel is selected. That is, though the TMCC signals need not be frequently transmitted from the side of the transmission device, the receiving device cannot receive the main signals until it receives the TMCC signals. Therefore, it is preferred to enable the receiving device to receive the TMCC signals relatively frequently so as to reduce its latency time. Thus, it is preferred to reduce the frequency of transmission of the TMCC signals within such a range that the latency time of the receiving device will not be long.

Figure 12:
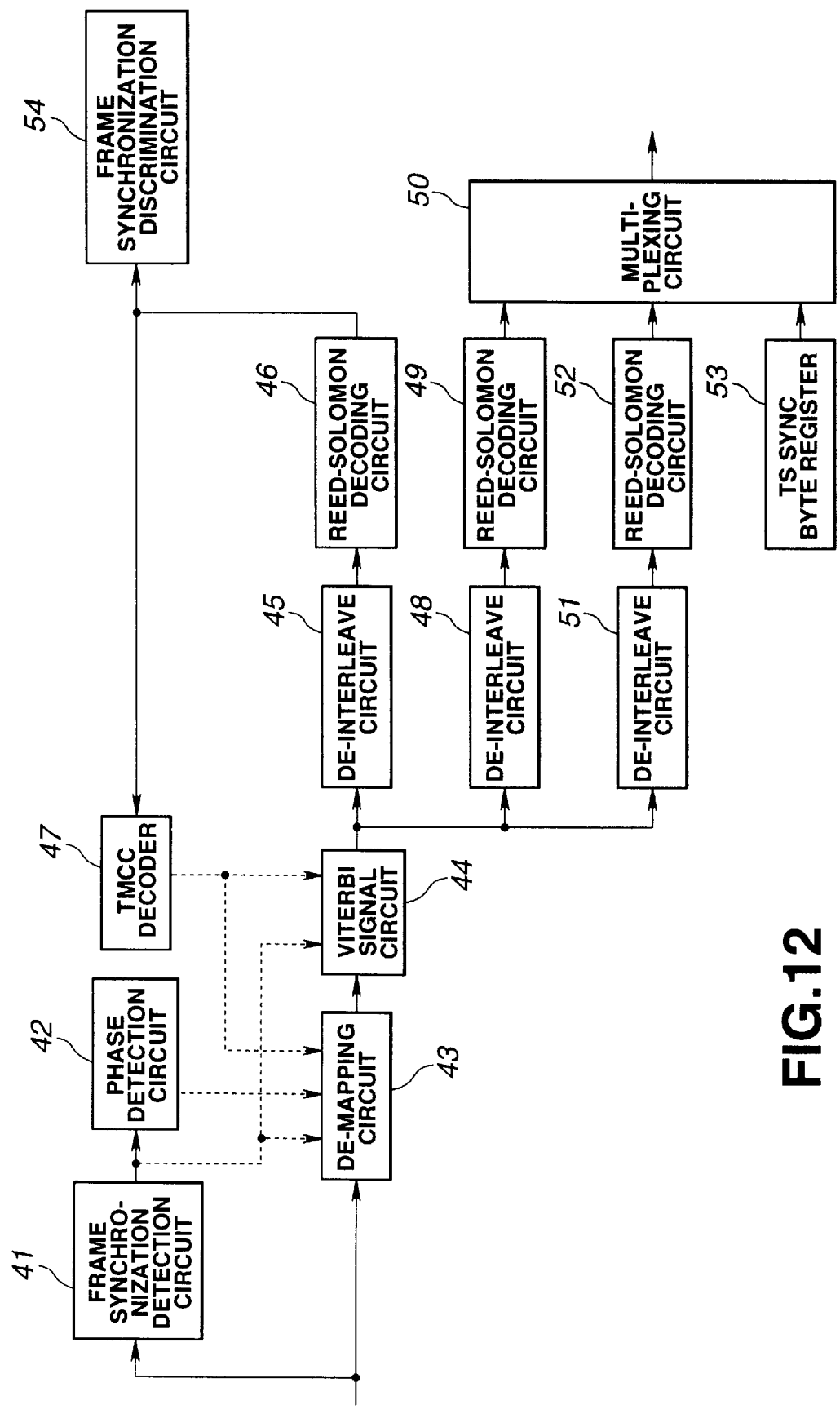
FIG. 12 is a block diagram showing an exemplary structure of a receiving device to which the present invention is applied.

FIG. 12 shows an exemplary structure of the receiving device. Modulated signals transmitted through a predetermined transmission line are inputted to a frame synchronization detection circuit 41 and a de-mapping circuit 43. The frame synchronization detection circuit 41 detects the frame synchronizing signals from the inputted signals, and outputs the detection result to the de-mapping circuit 43 and a Viterbi decoding circuit 44. A phase detection circuit 42 detects phase information of the signal points from the output of the frame synchronization detection circuit 41, and outputs the detection result to the de-mapping circuit 43. The de-mapping circuit 43 detects the signal points based on the output of a TMCC decoder 47 or the frame synchronization detection circuit 41, then generates a metric corresponding the signal points, and outputs the generated metric to the Viterbi decoding circuit 44. The TMCC decoder 47 demodulates (decodes) the inputted TMCC signals, and outputs the demodulation result (modulation system and coding rate) to the de-mapping circuit 43 and the Viterbi decoding circuit 44.

The Viterbi decoding circuit 44 carries out Viterbi decoding of the signals from the de-mapping circuit 43 on the basis of the output from the TMCC decoder 47 or the frame synchronization detection circuit 41. The Viterbi decoding circuit 44 carries out convolutional decoding processing on the demodulated signals of the BPSK signals (frame synchronizing signals and TMCC signals) following the frame synchronizing signals, and outputs the resultant signals to a de-interleave circuit 45. The de-interleave circuit 45 is a circuit for carrying out de-interleave processing corresponding to interleave processing of the interleave circuit 5 of FIG. 3. A Reed-Solomon decoding circuit 46 decodes the RS (48,38) codes inputted from the de-interleave circuit 45, and outputs the decoding result to the TMCC decoder 47 and a frame synchronization discrimination circuit 54.

A de-interleave circuit 48 and a de-interleave circuit 51 de-interleave the low-hierarchy image signals LQ and the high-hierarchy image signals HQ supplied from the Viterbi decoding circuit 44, in accordance with interleave processing of the interleave circuits 8 and 15 of FIG. 3, respectively. Reed-Solomon decoding circuits 49, 52 carry out decoding processing of the RS (204,188) codes of the outputs from the de-interleave circuits 48, 51, respectively, corresponding to the Reed-Solomon coding circuits 6, 13 of FIG. 3. A TS sync byte register 53 stores sync bytes to be appended to each packet of the TS, and a multiplexing circuit 50 appends the sync bytes, read out from the TS sync byte register 53, to the packet of the TS outputted from the Reed-Solomon decoding circuit 49 or 52.

In the receiving device of FIG. 12, not only the frame synchronizing signals but also the main signals are inputted to the frame synchronization detection circuit 41. On the assumption that the frame synchronizing signals consist of 16 bits, as described above, the frame synchronizing signals are converted to 32-bit data by the convolutional coding circuit 10 of the transmission device. The length (number of bits) of the frame synchronizing signals is set to be greater than the constraint length of the convolutional coding circuit 10. (The constraint length is the minimum number of bits necessary for convolutional operation, and in the example of FIG. 11, the constraint length is 7.) Therefore, the unique bits of the frame synchronizing signals are held by all the registers 61 to 66 of the convolutional coding circuit 10, and also the inputs to the exclusive-OR circuits 67, 71 are the bits constituting the frame synchronizing signals. In this state, since the entire data used for convolutional coding are constituted by the bits of the frame synchronizing signals, the data obtained as a result of convolutional operation are also unique data.

Specifically, as shown in FIG. 13, even in the state where the first bit of the frame synchronizing signals is inputted to the shift register 61 of the convolutional coding circuit 10 of FIG. 11 (at timing t1), the preceding data (data A to E except for the frame synchronizing signals) are held by the shift registers 62 to 66 on the subsequent stage. Therefore, the data outputted from the exclusive-OR circuits 70, 74 are not uniquely defined. When the first bit of the frame synchronizing signals is held by the shift register 66 and the sixth bit is held by the shift register 61 to generate the state where the seventh bit is supplied to the exclusive-OR circuits 67, 71 (at timing t6), the data outputted from the exclusive-OR circuits 70, 74 have unique values corresponding to the frame synchronizing signals.

Similarly, the outputs from the exclusive-OR circuits 70, 74 have unique values until when the 10th bit of the frame synchronizing signals is held by the shift register 66 and the 15th bit is held by the shift register 61 to generate the state where the 16th bit of the frame synchronizing signals is inputted to the exclusive-OR circuits 67, 71 (at timing t15). Then, as the 16th bit of the frame synchronizing signals is held by the shift register 61 (at timing t16), the next data "a" following the frame synchronizing signals is inputted to the exclusive-OR circuits 67, 71. Therefore, subsequently, the data outputted from the exclusive-OR circuits 70, 74 are not uniquely defined.

During the period from when the seventh bit of the frame synchronizing signals is inputted to the exclusive-OR circuits 67, 71 until when the 16th bit of the frame synchronizing signals is inputted to the exclusive-OR circuits 67, 71, the frame synchronization detection circuit 41 detects the frame synchronizing signals by detecting the unique patterns generated from the exclusive-OR circuits 70, 74.

As the position of the frame synchronizing signals is found, the absolute phase of the signal points can be detected. Thus, the phase detection circuit 42 detects the absolute phase of the signal points from the detection result outputted from the frame synchronization detection circuit 41. Thus, indefiniteness of the phase of the regenerative carrier wave is removed.

The de-mapping circuit 43 carries out de-mapping processing in accordance with the principle shown in FIG. 4 with respect to the signals following the frame synchronizing signals as BPSK-modulated signals, with reference to the detection signal inputted from the frame synchronization detection circuit 41, and outputs the corresponding metric to the Viterbi decoding circuit 44. The Viterbi decoding circuit 44 assumes the signals following the frame synchronizing signals as being ½ convolutional-coded, with reference to the detection signal inputted from the frame synchronization detection circuit 41, and carries out Viterbi decoding of the ½ convolutional-coded signals.

The convolutional-decoded signals including the frame synchronizing signals and the TMCC signals, outputted from the Viterbi decoding circuit 44, are inputted to the de-interleave circuit 45 and de-interleaved by this de-interleave circuit 45. The output of the de-interleave circuit 45 is inputted to the Reed-Solomon decoding circuit 46 and Reed-Solomon-decoded by this Reed-Solomon decoding circuit 46 so that the transmission error is corrected. The output of the Reed-Solomon decoding circuit 46 is supplied to the TMCC decoder 47 and the frame synchronization discrimination circuit 54.

The TMCC decoder 47 decodes the TMCC signals from the inputted signals, and extracts the transmission control information such as the modulation system and the coding rate of the subsequent main signals. Then, the TMCC decoder 47 outputs the extraction result to the de-mapping circuit 43 and the Viterbi decoding circuit 44. The de-mapping circuit 43 and the Viterbi decoding circuit 44 then process the inputted main signals in accordance with the transmission control information from the TMCC decoder 47.

The de-mapping circuit 43 carries out de-mapping processing on the main signals supplied next to the TMCC signals, in accordance with the transmission control information from the TMCC decoder 47. Specifically, if the inputted main signals are QPSK-modulated, the de-mapping circuit 43 carries out de-mapping processing in accordance with the principle shown in FIG. 5. If the inputted main signals are TC 8PSK-modulated, the de-mapping circuit 43 carries out de-mapping processing in accordance with the principle shown in FIG. 6.

For example, the de-mapping circuit 43 carries out de-mapping processing of the QPSK modulation system with respect to the low-hierarchy image signals LQ, and carries out de-mapping processing of the TC 8PSK modulation system with respect to the high-hierarchy image signals HQ.

The metric outputted from the de-mapping circuit 43 is inputted to the Viterbi decoding circuit 44. The Viterbi decoding circuit 44 carries out convolutional decoding processing in accordance with the transmission control signals outputted from the TMCC decoder 47. For example, with respect to the low-hierarchy image signals LQ, the Viterbi decoding circuit 44 carries out de-puncturing processing and decoding processing corresponding to convolutional coding at a coding rate of ½. With respect to the high-hierarchy image signals HQ, the Viterbi decoding circuit 44 carries out trellis decoding processing at a coding rate of ⅔.

The demodulated signals of the main signals outputted from the Viterbi decoding circuit 44 are inputted to the de-interleave circuits 48, 51, and de-interleaved by these circuits 48, 51. The outputs of the de-interleave circuits 48, 51 are inputted to the Reed-Solomon decoding circuits 49, 52. The Reed-Solomon decoding circuits 49, 52 carry out decoding processing of the RS (204,188) codes. The multiplexing circuit 50 multiplexes the sync bytes held by the TS sync byte register 53 to the position where the TMCC signal on the leading end of each packet of each frame, read out from the Reed-Solomon decoding circuit 49 or 52, is arranged. Thus, the original TS packets as shown in FIG. 7 are obtained.

Figure 14:
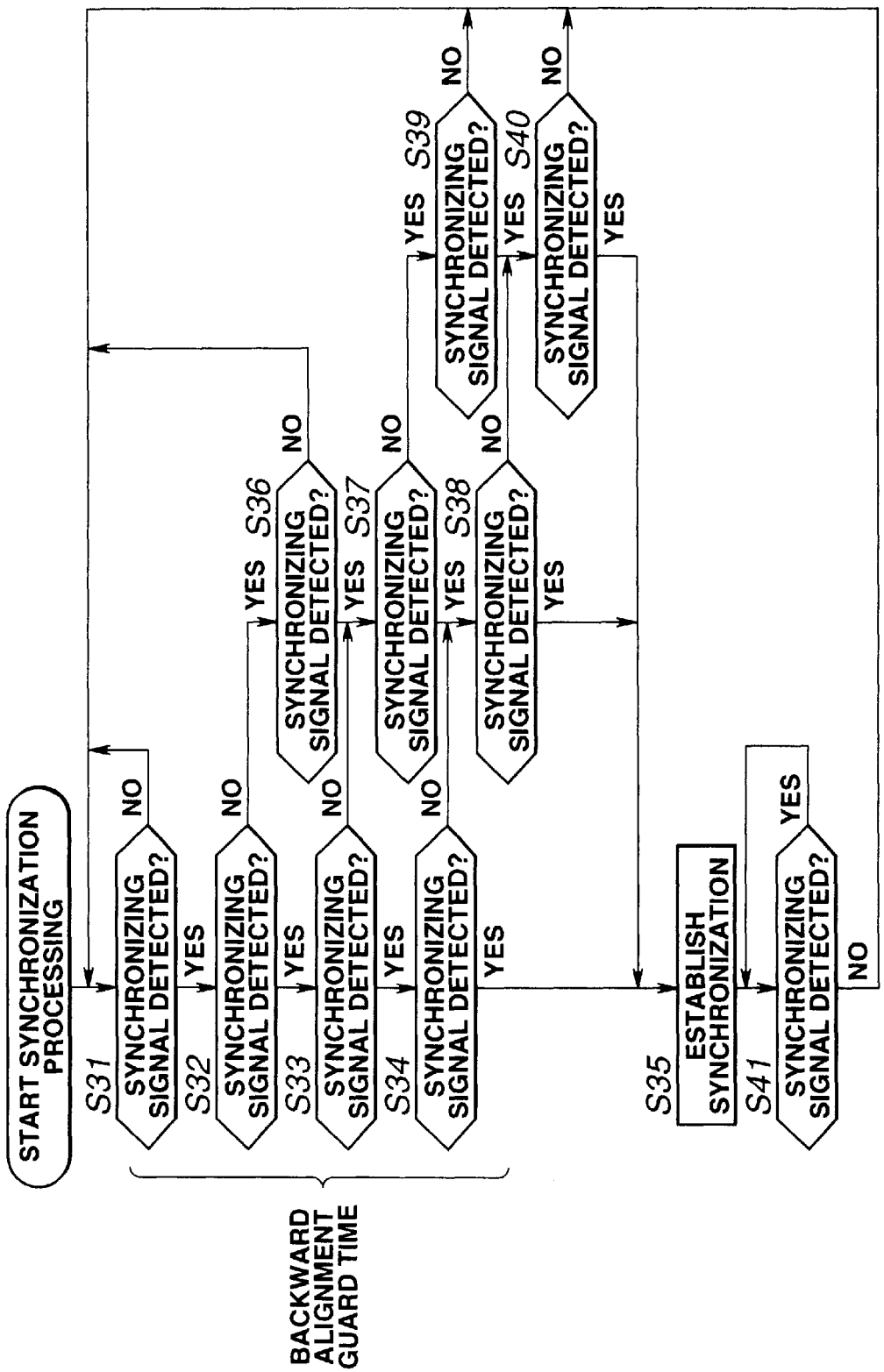
FIG. 14 is a flowchart for explaining synchronization processing in the receiving device of FIG. 11.

Guard processing for the frame synchronizing signals will now be described. The frame synchronization detection circuit 41 detects the frame synchronizing signals, and carries out backward alignment guard processing for the frame synchronizing signals as indicated by steps S31 to S40 of FIG. 14. The processing of steps S31 to S40 is similar to processing of steps S1 to S10 of FIG. 2 and therefore will not be described further in detail.

After synchronization establishment processing is carried out at step S35, the frame synchronization discrimination circuit 54 detects the frame synchronizing signals from the output of the Reed-Solomon decoding circuit 46 and carries out frame synchronization discrimination processing, at step S41. Since the signals outputted from the Reed-Solomon decoding circuit 46 are signals after convolutional decoding of the frame synchronizing signals by the Viterbi decoding circuit 44, the error on the transmission line is already corrected. Therefore, forward alignment guard operation as indicated by steps S11 to S15 of FIG. 2 is not necessary in this embodiment. If failure to detect the frame synchronization signals from the output of the Reed-Solomon decoding circuit 46 occurs even once, the frame synchronization discrimination circuit 54 immediately discriminates that pulling out of synchronism has taken place.

A second embodiment will now be described. In the BS digital broadcast, the broadcasting service side can select the transmission system such as TC 8PSK®=⅔, r denoting the coding rate), QPSK®=¾), QPSK®=½), or BPSK®=½) in order to enable transmission of two programs of high-definition television signals, represented by so-called hi-vision, on one channel, and to enable reliable transmission even at the time of attenuation of the electric field strength. Therefore, information about which transmission system is employed can be transmitted as the TMCC signals to the side of the receiving device, as described above.

On the assumption that the main signals are transmitted as high-definition television signals while the TMCC signals are transmitted in the BPSK system ®=½), as described above, there is a high possibility that the main signals are transmitted in the TC 8PSK system ®=⅔). Since the meteorological conditions vary from region to region, it is considered that the receiving C/N ratio is extremely lowered in a predetermined region due to the characteristics of satellite broadcast. It is necessary to enable secure transmission and reception of the TMCC signals even under such conditions.

In general, if the transmission system is switched, the branch metric defined by the Viterbi decoding circuit 44 becomes different. The Viterbi decoding circuit 44 carries out path control in accordance with the value of the state metric formed by accumulating branch metrics. If the transmission system is switched, branch metrics after switching are accumulated with respect to the previously accumulated state metric. If path control is carried out by that state metric, an error might be propagated. Particularly, in the case where the number of multi-value levels is abruptly changed as in the change from BPSK to 8PSK, such adverse effect becomes conspicuous.

Thus, in order to cut off such propagation of the error, it can be considered to carry out so-called termination processing. This termination processing is to insert a specified (known) pattern into the transmission data. The specified pattern for termination processing does not carry information. Therefore, even when this specified pattern portion has an error, the information will not be lost and the specified pattern can be assumed as a buffer bit series in switching from a predetermined transmission system to another transmission system.

Figure 15A:
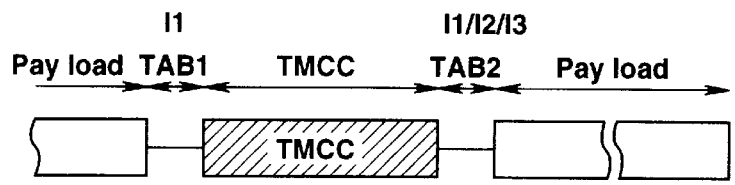
FIG. 15A shows an input bit series to the convolutional coding circuit 10.
Figure 15B:
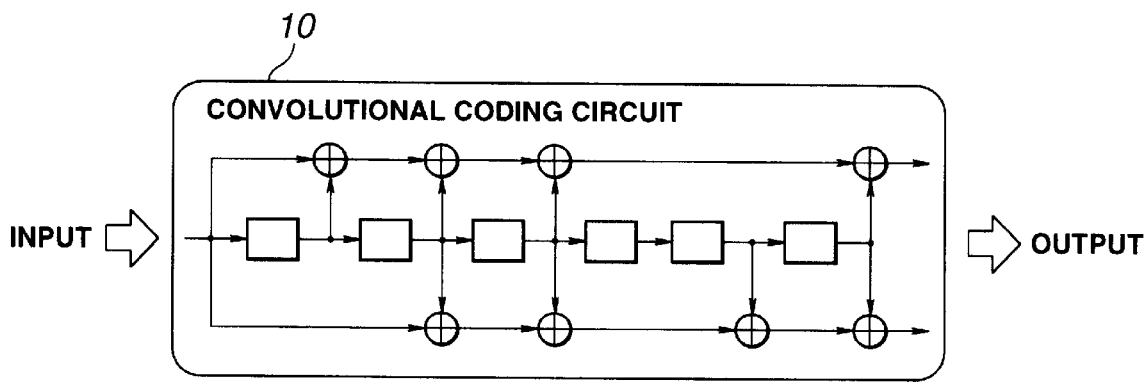
FIG. 15B illustrates termination processing of convolutional codes.
Figure 15C:
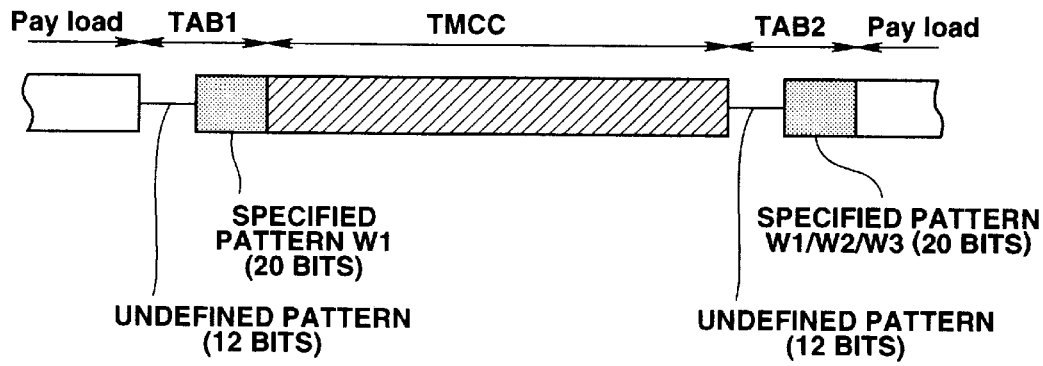
FIG. 15C shows an output bit series from the convolutional coding circuit 10.

As shown in FIGS. 15A to 15C, not only frame synchronizing signals (TAB1) are inserted at the leading end of the TMCC signals (between the main signals (payload) and the TMCC signals), but also a predetermined pattern of signal (TAB2) for termination processing is inserted on the back side of the TMCC signals (between the TMCC signals and the next main signals). The length of the back signal TAB2 in this case is, for example, two bytes corresponding to the frame synchronizing signals (TAB1). This signal is stored in advance in the synchronization register 2 (FIG. 3) together with the frame synchronizing signals, and is suitably read out from the synchronization register 2.

In FIGS. 15A to 15C, an input bit series shown in FIG. 15A is inputted to the convolutional coding circuit 10 shown in FIG. 15B, and an output bit series shown in FIG. 15C is outputted form the convolutional coding circuit 10.

To terminate convolutional coding, it suffices to insert a known bit series which is smaller by 1 than the constraint length. Specifically, in the embodiment of FIG. 3, since the convolutional coding circuit 10 has a constraint length of 7, a known 6-bit code string may be inserted as a code for termination processing. However, if a longer known bit series is inserted, a coding output greater than the constraint length becomes a specified pattern as described above. For example, if 2-byte frame synchronizing signals are inserted before the TMCC signals as shown in FIG. 15A, 12 bits (12 symbols) of the output bit series of the convolutional coding circuit 10 are an undefined pattern, and the subsequent 20-bit (20-symbol) pattern is a specified pattern, as shown in FIG. 15C. In the embodiment of FIG. 3, the frame synchronization detection circuit 41 detects this specified pattern as frame synchronizing signals.

If the 2-byte signal for termination processing is added to the back side of the TMCC signals as shown in FIG. 15A, 12 bits (12 symbols) of the corresponding 4-byte signals of the output of the convolutional coding circuit 10 are an undefined pattern, and the subsequent 20 bits (20 symbols) are a specified pattern. As this specified pattern, the frame number of a super frame can be transmitted. The super frame consists of eight frames. The frame number indicating the order (position) of a frame of the eight frames can be transmitted as the specified pattern of signal on the back side of the TMCC signals.

In this case, similar to the above-described case, the frame synchronization detection circuit 41 may detects the 4-byte signals on the forward side of the TMCC signals as the frame synchronizing signals. However, it may also detect the 4-byte signals on the back side or both of the 4-byte signals on the forward side and the back side as the frame synchronizing signals.

Thus, termination processing for restraining propagation of the error can be carried out, and these signals can be used as the frame synchronizing signals or the frame number.

Moreover, in this embodiment, both the 4-byte signals before the TMCC signals and the 4-byte signals after the TMCC signals are BPSK-modulated by the mapping circuit 11. From the viewpoint of convolutional code termination processing, the same modulation system as that of a signal as a termination target is generally used. For example, as shown in FIGS. 15A to 15C, since the 4-byte signals added before the TMCC signals are adapted for terminating the convolutional code of the main signals (payload), the 4-byte signals are generally 8PSK-modulated similarly to the main signals.

However, with the same C/N ratio, the branch metric of 8PSK(®=⅔) is more reliable than the branch metric of BPSK(®=½). In addition, to improve the reliability of the TMCC signals transmitted in the BPSK system (®=½), it is necessary to improve the reliability of the state metric for path control even a little. In view of this, it is more advantageous to carry out convolutional code termination processing in the BPSK system (®=½). Thus, in this embodiment, termination processing of the TMCC signals is carried out by using the 4-byte signals on the back side modulated in the same BPSK system (®=½) as that of the TMCC signals, and also, termination processing of the main signals (payload) is carried out by using the 4-byte signals on the back side of the main signals (i.e., 4-byte signals on the forward side of the TMCC signals) modulated in the BPSK system (®=½), which is the modulation system of the TMCC signals, instead of the 8PSK system (®=⅔), which the modulation system of the main signals.

Therefore, in the receiving device, the TMCC signals and the 4-byte signals on the forward and back sides thereof are BPSK-demodulated by the de-mapping circuit 43.

As shown in FIGS. 15A to 15C, an input series I1 is arranged in TAB1 on the forward side of the TMCC signals, and input series I1, I2 or I3 is arranged in TAB2 on the back side of the TMCC signals.

At this point, the convolutional coding circuit 10 outputs a specified pattern W1 in TAB1 on the forward side of the TMCC signals, and outputs W1, W2 or W3 in TAB2 on the back side of the TMCC signals.

Meanwhile, in the case where the frame synchronization detection circuit 41 of the receiving device shown in FIG. 12 detects the frame synchronizing signals, it is preferred that the auto-correlation function of the specified pattern (frame synchronizing signals) is in an impulse-like manner. The auto-correlation function is defined by the following equation.

$$R_W = \sum_{t \geq \tau}^{19} (2 \times C(t) - 1) \times (2 \times C(t-\tau) - 1) \qquad (0 \leq \tau \leq 19)$$

In this equation, C(t) represents a specified pattern of the code output series (specified pattern after convolutional coding by the convolutional coding circuit 10) W1. C(0) represents MSB of W1, and C(19) represents LSM of W1. Also, t is a value of 0 to 19. If t and t−τ exceed the range of 0 to 19, the value of(2×C(t)−1)×(2×C(t−τ)−I) in the above equation is 0.

0xD439B can be used as the specified pattern W1, 0x0B677 can be used as the specified pattern W2, and 0x578DB can be used as the specified pattern W3.

If 0xD439B is used as the specified pattern W1, R(0)=20 and |R(τ)|≦3 (τ 0) hold, and an impulse-like auto-correlation characteristic is realized. Similarly, if 0x0B677 or 0x578DB is used as the specified pattern W2 or W3, an impulse-like auto-correlation function can be realized.

When the specified patterns outputted by the convolutional coding circuit 10 are W1, W2 and W3, it is preferred that an impulse-like auto-correlation characteristic is realized with respect to the input series patterns I1, I2 and I3 inputted therein. In this case, the auto-correlation function is defined by the following equation.

$$R_I = \sum_{t=\tau}^{15} (2 \times I(t) - 1) \times (2 \times I(t-\tau) - 1) \qquad (0 \leq \tau \leq 15)$$

In this equation, I(t) represents an input series corresponding to W1. I(0) represents MSB of I1, and C(15) represents LSM of I1. Also, t takes a value of 0 to 15. If t and t−τ exceed the range of 0 to 15, the value of (2×I(t)−I)×(2×I(t−τ)−1) in the above equation is 0.

With respect to the input series I1 corresponding to the specified pattern W1, R(0)=16 and |R(τ)|≦3 (τ 0) hold, and an impulse-like auto-correlation characteristic is realized.

With respect to the input series I2 corresponding to the specified pattern W2, R(0)=16 and |R(τ)|≦5(τ 0) hold. In addition, with respect to the input series I3 corresponding to the specified pattern W3, R(0)=16 and |R(τ)|≦7 (τ 0) hold, and a good auto-correlation characteristic is realized.

When the specified pattern W1 is 0xD439B, the frame synchronization detection circuit 41 of the receiving device calculates, for each bit, exclusive OR of the value of the specified pattern 0xD439B (=11010100001110011011) as a detection window and the inputted 20-bit data. If the corresponding bits of the 20 bits are the same, the calculated value of exclusive OR for each bit is 0. If the corresponding bits are different, the calculated value is 1. The sum of the calculated values of exclusive OR of the 20 bits becomes a correlation value. When the same data as the detection window is inputted, the correlation value is 0. When other data is inputted, the correlation value is sufficiently greater than 0. Thus, the frame synchronizing signals (specified pattern W1 (0xD439B)) can be detected.

In the input series I1(0x032E) (=0000001100101110) corresponding to the specified pattern W1 (0xD439B), the leading six bits are 0 and therefore can initialize the convolutional coding circuit 10. That is, these six bits of 0 are held by the shift registers 61 to 66 (FIG. 11) and the previous code series can be terminated. This also means termination of the input code series by 0. As a result, the structure of the transmission device and the receiving device can be simplified.

In the input series 0xA340 (=10100001101000000) corresponding to the specified pattern W2 (0x0B677) and the input series 0x78C0 (=0111100011000000) corresponding to the specified pattern W3 (0x578DB), the last six bits are 0. In this case, too, the previous code series can be terminated in the convolutional coding circuit 10. This also means termination of the TMCC signals and initialization of the next code. Thus, the structure of the transmission device and the receiving device can be simplified further.

Figure 16:
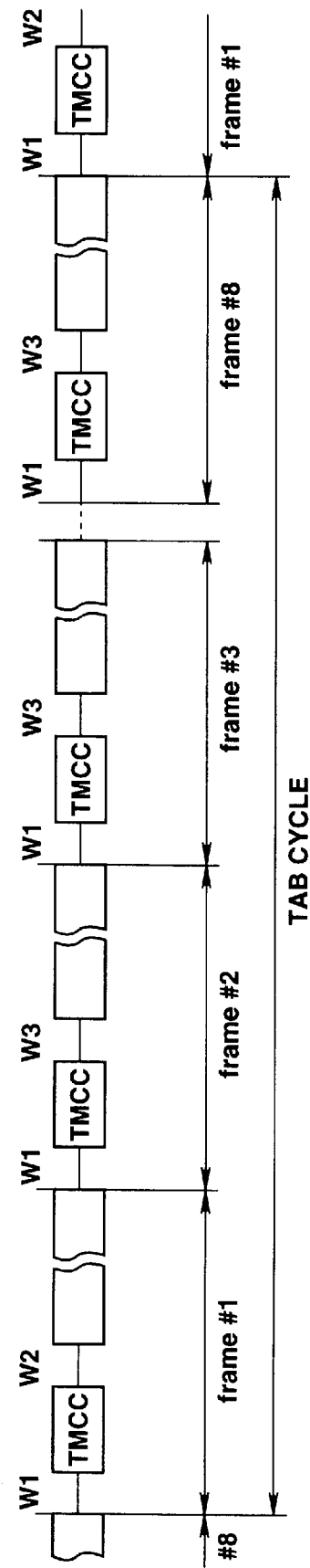
FIG. 16 illustrates arrangement of a specified pattern in a super frame.
Figure 17:
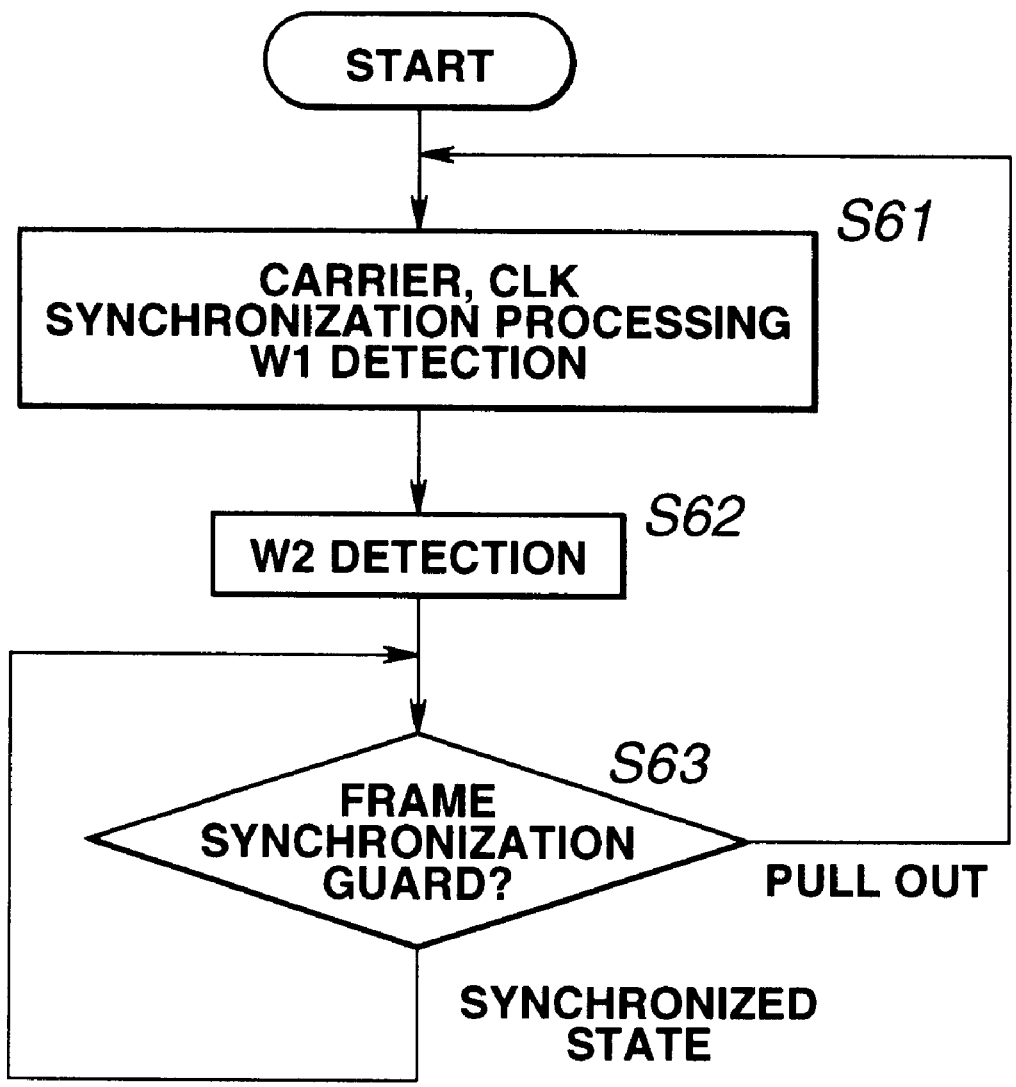
FIG. 17 is a flowchart for explaining specified pattern detection processing in the format of FIG. 16.

FIG. 16 shows an example of cyclic arrangement of the specified patterns W1 to W3 with reference to a super frame. In this example, in frame 1, W1 is arranged on the forward side of the TMCC signals and W2 is arranged on the back side. In frames 2 to 8, W1 is arranged on the forward side of the TMCC signals and W3 is arranged on the back side. By such arrangement, the super frame can be detected. The flowchart of FIG. 17 shows the processing in this case.

Specifically, first at step S61, the frequency is adjusted for tuning the receiving device, by using correlation of the specified patterns W1 arranged on the forward sides of the TMCC signals of the respective frames. That is, such control is carried out that a clock is generated to realize frame synchronization so as to realize an optimum correlation value of the specified pattern W1.

Then, at step S62, a signal, located at a back position by the length of the TMCC signals from the position where the specified pattern W1 is detected, is detected as the specified pattern W2. As shown in FIG. 16, this specified pattern W2 is arranged only in the leading frame of the super frame, and the specified pattern W3 is arranged in the remaining seven frames. Thus, the frame in which the specified pattern W2 is detected is detected as the leading frame of the super frame.

Then, at step S63, frame synchronization guard is carried out. If the synchronized state is obtained, frame synchronization guard processing is repeated. If pulling of frame synchronism occurs, the processing returns to step S61 and the subsequent processing is repeated.

Figure 18:
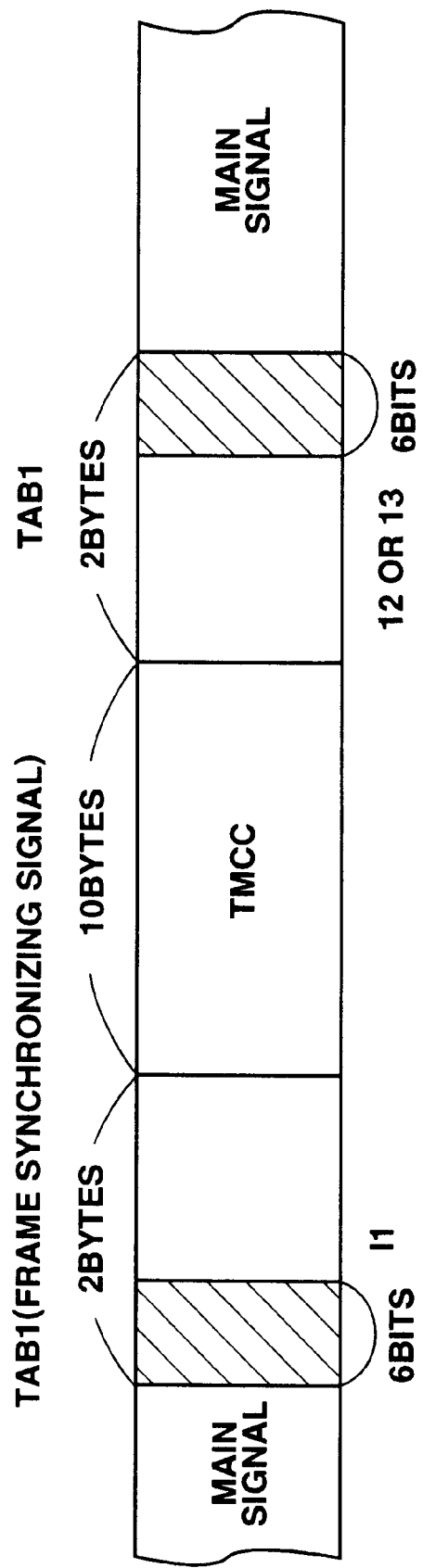
FIG. 18 shows the format of TMCC signals and main signals (payload).

As described above, the last six bits of the input series I2 or I3 of the specified pattern W2 or W3 on the back side of the TMCC signals are all 0. As shown in FIG. 18, the convolutional coding circuit 10 for the main signals (payload) can code the main signals from the state of being initialized with 000000, regardless of the contents of the TMCC signals. After completion of coding of the main signals (payload), the convolutional coding circuit 10 can code the signals up to 000000 as the codes of the main signals (payload) because the six bits of 0 are arranged at the leading end of the input series I1 of the specified pattern W1 inputted prior to the TMCC signals.

In FIG. 18, I1=0x032E (=0000001100101110), I2=0xA340 (=1010001101000000), and I3=0x78C0 (=0111100011000000) are assumed.

Figure 19:
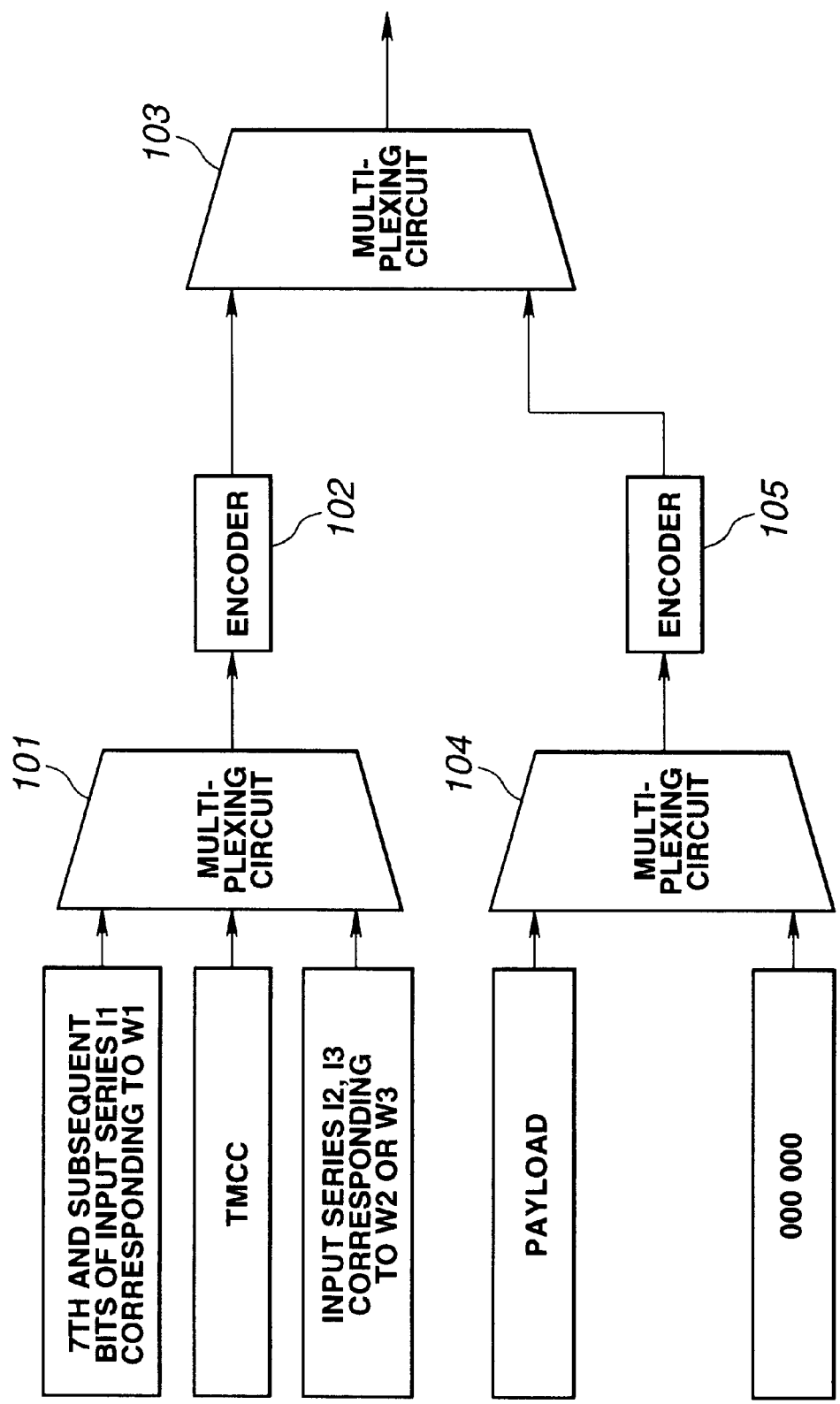
FIG. 19 shows an exemplary structure in the case where TMCC signals and main signals (payload) are separately coded.

FIG. 19 shows another exemplary structure for convolutional coding in the transmission device. In this example, a multiplexing circuit 101 is supplied with data of the seventh and subsequent bits of the input series I1 corresponding to the specified pattern W1, the TMCC signals, and the input series I2 or I3 corresponding to the specified pattern W2 or W3. The multiplexing circuit 101 selects any of these inputs, and supplies the selected input to an encoder 102 as the convolutional coding circuit 10. The encoder 102 is initialized by six bits of 0 before the seventh bit of the input series I1 corresponding to the inputted specified pattern W1 is inputted.

On the other hand, a multiplexing circuit 104 is supplied with the main signals and 6-bit data 000000. The multiplexing circuit 104 selects either one of these inputs, and supplies the selected input to an encoder 105 as the convolutional coding circuit 10. The encoder 105 is initialized by the six bits of 0 before the first data of the payload is inputted.

The output of the encoder 102 and the output of the encoder 105 are supplied to a multiplexing circuit 103, where these outputs are multiplexed and then outputted.

Thus, in the example of FIG. 19, the encoder 102 for coding the TMCC signals and the encoder 105 for coding the payload can be independently provided. Therefore, simply by newly adding the encoder 102 to the encoder 105 normally provided as the existing transmission device, the transmission device to which the present invention can be applied can be easily realized.

Figure 20:
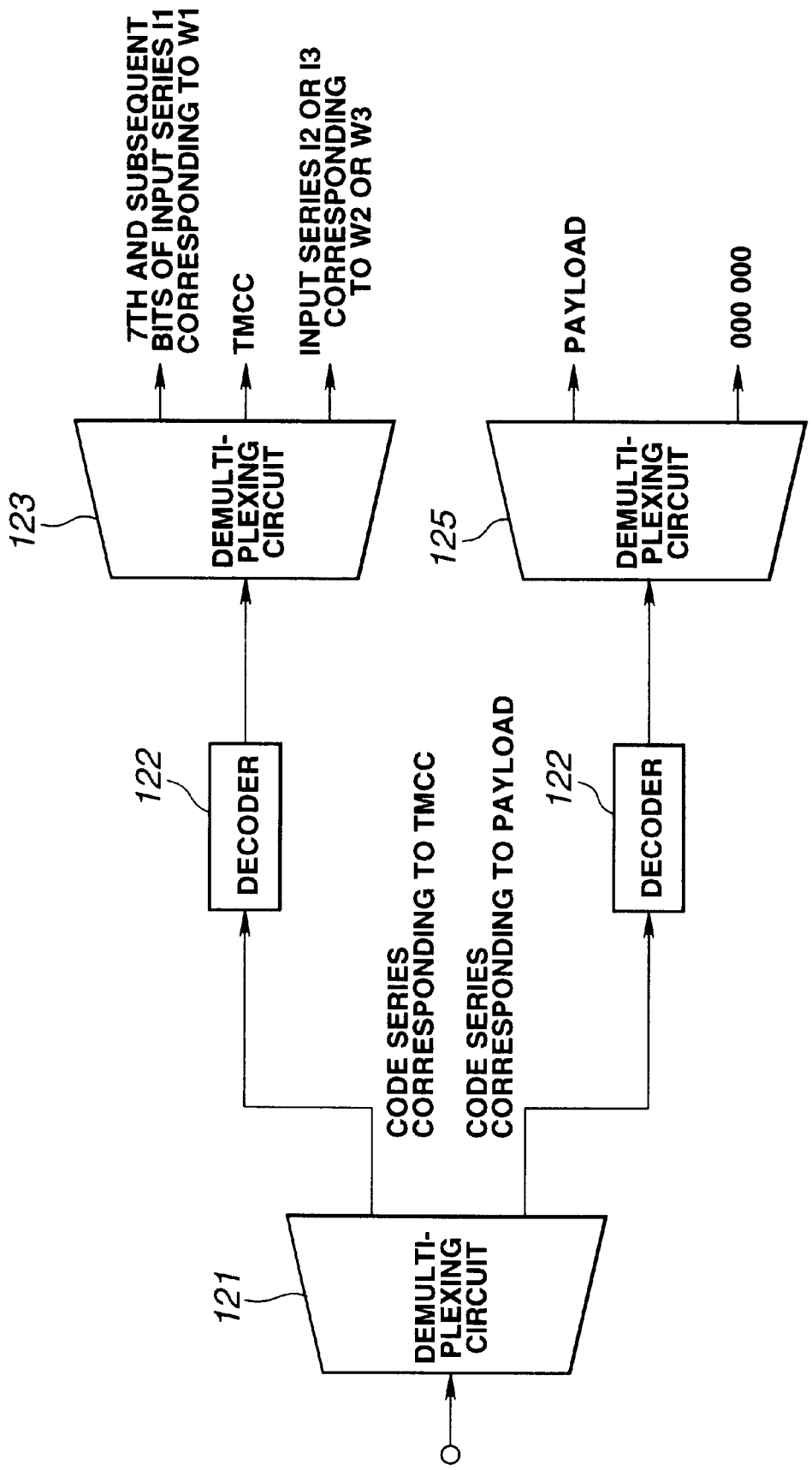
FIG. 20 shows an exemplary structure in the case where TMCC signals and main signals (payload) are separately decoded.

As shown in FIG. 19, it can also be considered that the code series are independent between the TMCC signals and the main signals (payload). Therefore, in the receiving device, each corresponding code series can be independently decoded. FIG. 20 shows an exemplary structure in this case.

Specifically, in this example, a demultiplexing circuit 121 demultiplexes inputted codes into a code series corresponding to the TMCC signals and a code series corresponding to the payload. The demultiplexing circuit 121 supplies the former code series to a decoder 122 and the latter code series to a decoder 124. The decoder 122 decodes the inputted code series corresponding to the TMCC signals and supplies the decoding result to a demultiplexing circuit 123. The demultiplexing circuit 123 demultiplexes the decoding result from the decoder 122 into data of the seventh and subsequent bits of the input series I1 corresponding to the specified pattern W1, the TMCC signals, and the input series I2 or I3 corresponding to the specified pattern W2 or W3, and outputs these signals.

The decoder 124 decodes the main signals (payload) from the demultiplexing circuit 121 and outputs the decoding result to a demultiplexing circuit 125. The demultiplexing circuit 125 demultiplexes the data supplied from the decoder 124 into the payload and codes of six bits of 0, and outputs these data. Since the six bits of 0 are not substantially utilized, it suffices to extract only the main signals (payload).

Each of the decoder 122 and the decoder 124 corresponds to the Viterbi decoding circuit 44 of the receiving device shown in FIG. 12.

In this case, too, the receiving device to which the present invention can be applied can be easily constructed, simply by newly adding the decoder 122 to the decoder 124 normally provided in the receiving device.

Figure 21:
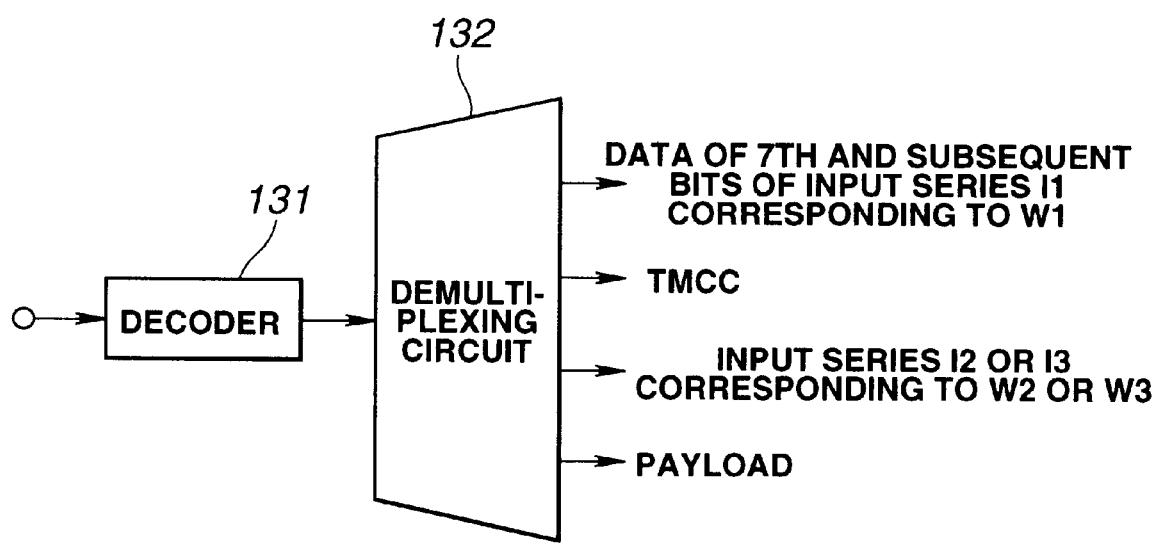
FIG. 21 is a block diagram showing an exemplary structure in the case where TMCC signals and main signals are commonly decoded.

As a matter of course, the decoder 122 and the decoder 124 shown in FIG. 20 can be made common as a decoder 131, as shown in FIG. 21. In this case, a demultiplexing circuit 132 demultiplexes the output of the decoder 131 into the data of the seventh and subsequent bits of the input series I1 corresponding to the specified pattern W1, the TMCC signals, the input series I2 or I3 corresponding to the specified pattern W2 or W3, and the main signals (payload), and outputs these signals.

Figure 22:
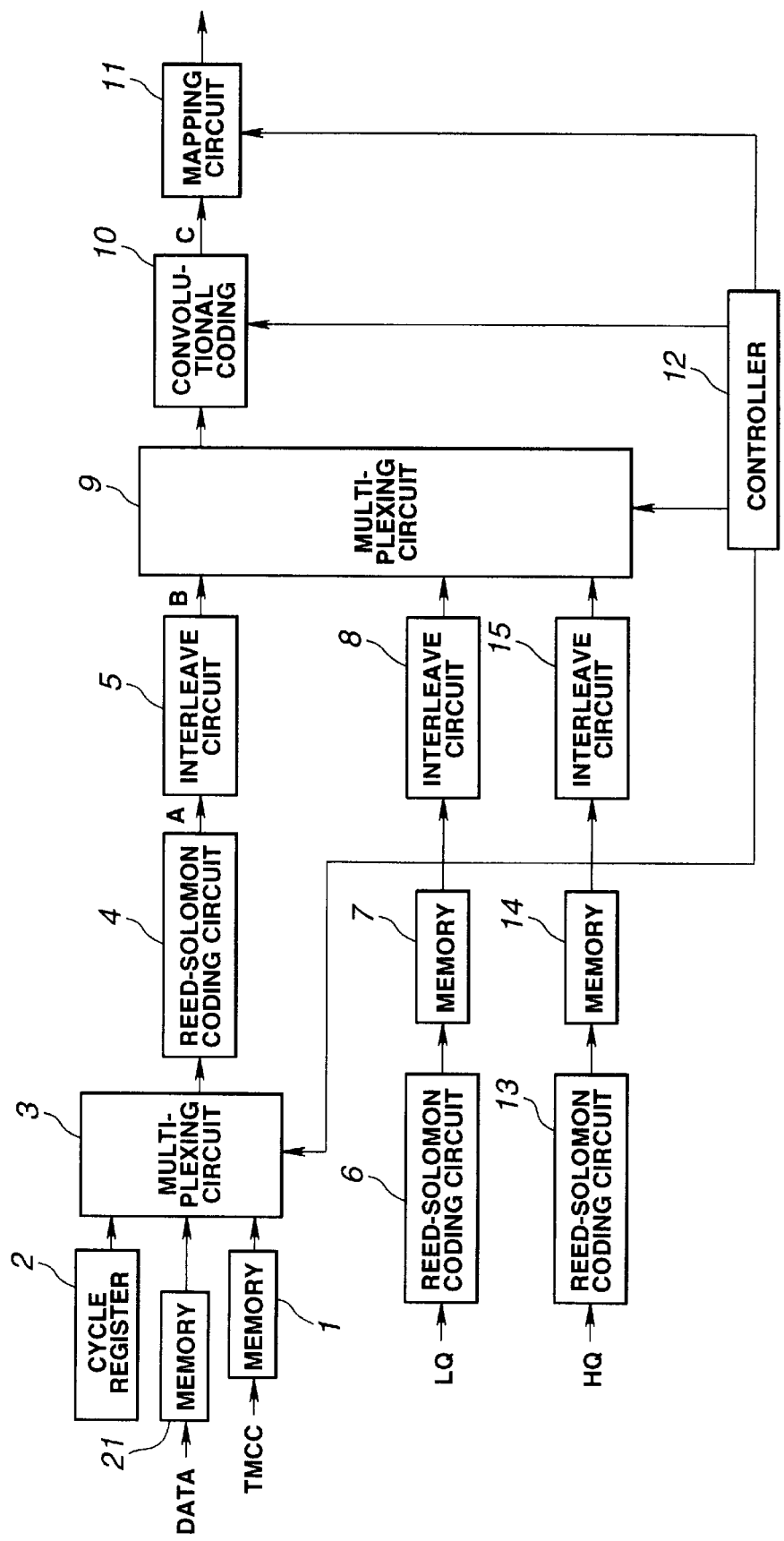
FIG. 22 is a block diagram showing another exemplary structure of a transmission device to which the present invention is applied.

A third embodiment will now be described. as the durability of the TMCC signals against the transmission line error is increased, the TMCC signals need not be transmitted frequently. Thus, in the case where the TMCC signals are not transmitted, it can be considered to transmit other data instead of the TMCC signals. FIG. 22 shows an exemplary structure of the transmission device in this case. In FIG. 22, the portions corresponding to the those of FIG. 3 are denoted by the same numerals. In the example of FIG. 22, data (sub-signals) to be transmitted instead of the TMCC signals are supplied to and stored in a memory 21. The multiplexing circuit 3 selects the TMCC signals stored in the memory 1 or the data stored in the memory 21, then multiplexes the selected data to the frame synchronizing signals supplied from the synchronization register 2, and outputs the multiplexing result. The other parts of the structure are similar those of FIG. 3.

In this case, however, the controller 12 controls the multiplexing circuit 9, and the header to be added to each frame includes an identifier indicating which of the TMCC signals and the other data are transmitted in that frame.

A fourth embodiment will now be described. The interleave circuit 5 of the transmission device is roughly classified into the block type and the convolutional type. In view of the small circuit scale and saving of portions corresponding to the forward and back RS codes at the same position, a convolutional interleave circuit is used as the interleave circuit 5, as described above.

Figure 23A:
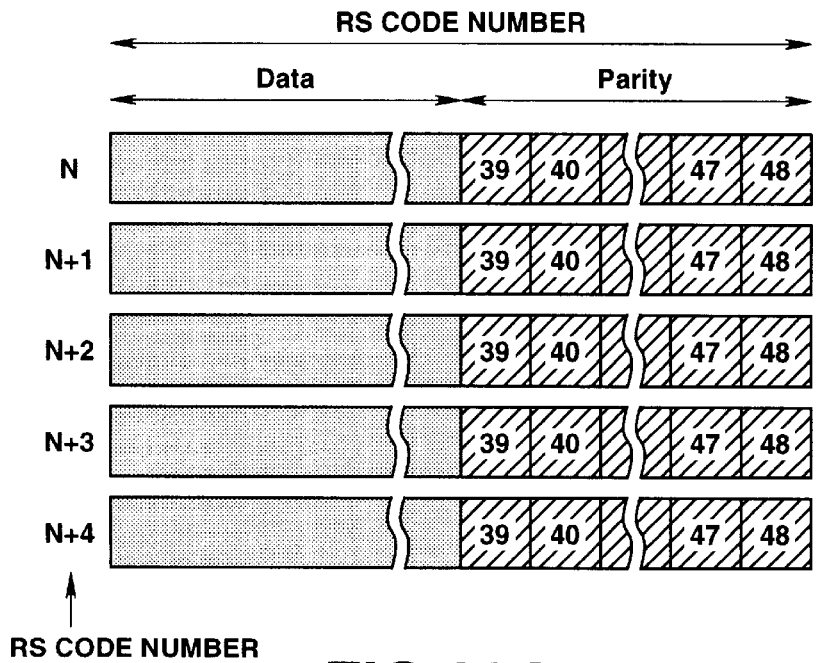
FIG. 23A shows input data of the interleave circuit 5.
Figure 23B:
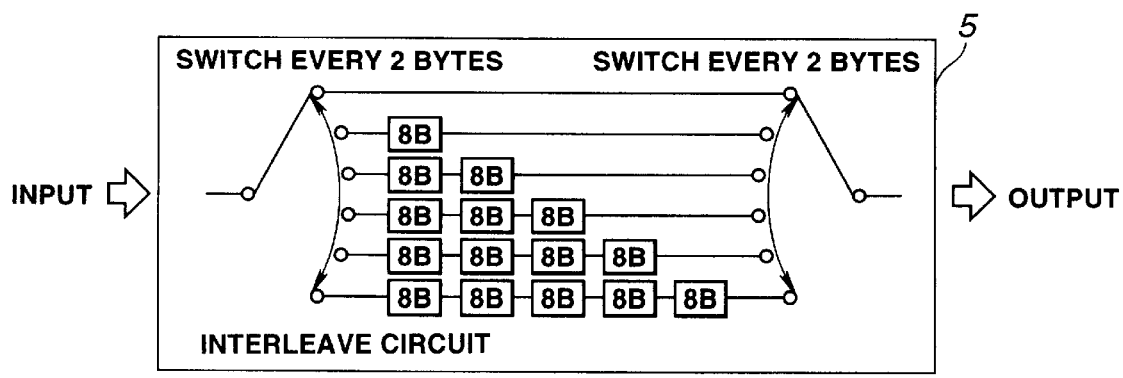
FIG. 23B illustrates processing of the interleave circuit 5.
Figure 23C:
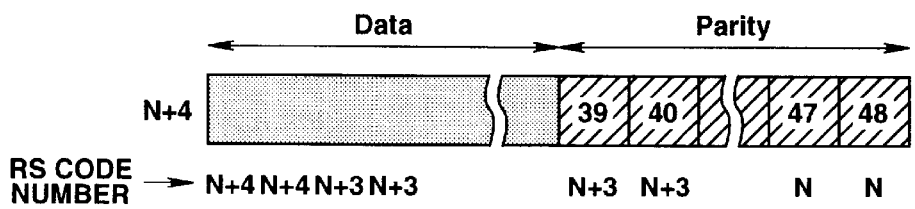
FIG. 23C shows output data of the interleave circuit 5.

FIGS. 23A to 23C show dispersion of the TMCC signals in the convolutional type interleave circuit 5 shown in FIG. 23B. As shown in FIGS. 23A to 23C, an RS code of number N consists of 48 bytes. The former 38 bytes thereof constitute data, and the latter 10 bytes constitute a parity. The leading two bytes of the 38-byte data are frame synchronizing signals, as described above. This is similarly applied to RS codes of numbers N+1 to N+4. The RS codes are generated by the Reed-Solomon coding circuit 4.

The convolutional type interleave circuit 5 shown in FIG. 23B directly outputs the leading two-byte frame synchronizing signals of the inputted data shown in FIG. 23A, but delays the subsequent data by one to five delay units for every two bytes, as described with reference to FIG. 9. As a result, the RS codes are dispersed every two bytes over the five RS codes, as shown in FIG. 23C. For example, in the RS code after interleave in which the leading two bytes (frame synchronizing signals) of the RS code of number N+4 are arranged at the leading end, data of the third and fourth bytes of number N+3 are arranged next, and data of the fifth and sixth bytes of number N+2 are subsequently arranged. Similarly, the position of each byte of the RS code before interleave is the same position even in the RS code after interleave.

Thus, if the TMCC signals of numbers N to N+4 are the same, the RS codes of number N to N+4 before and after interleave are equal, respectively. As described above, because of their characteristics as the transmission control signals, the TMCC signals are rarely changed and maintain the same data in most cases. Thus, in the receiving device, an error of the TMCC signals can be corrected by so-called majority discrimination processing without carrying out RS decoding of the Viterbi-decoded RS codes.

Figure 24:
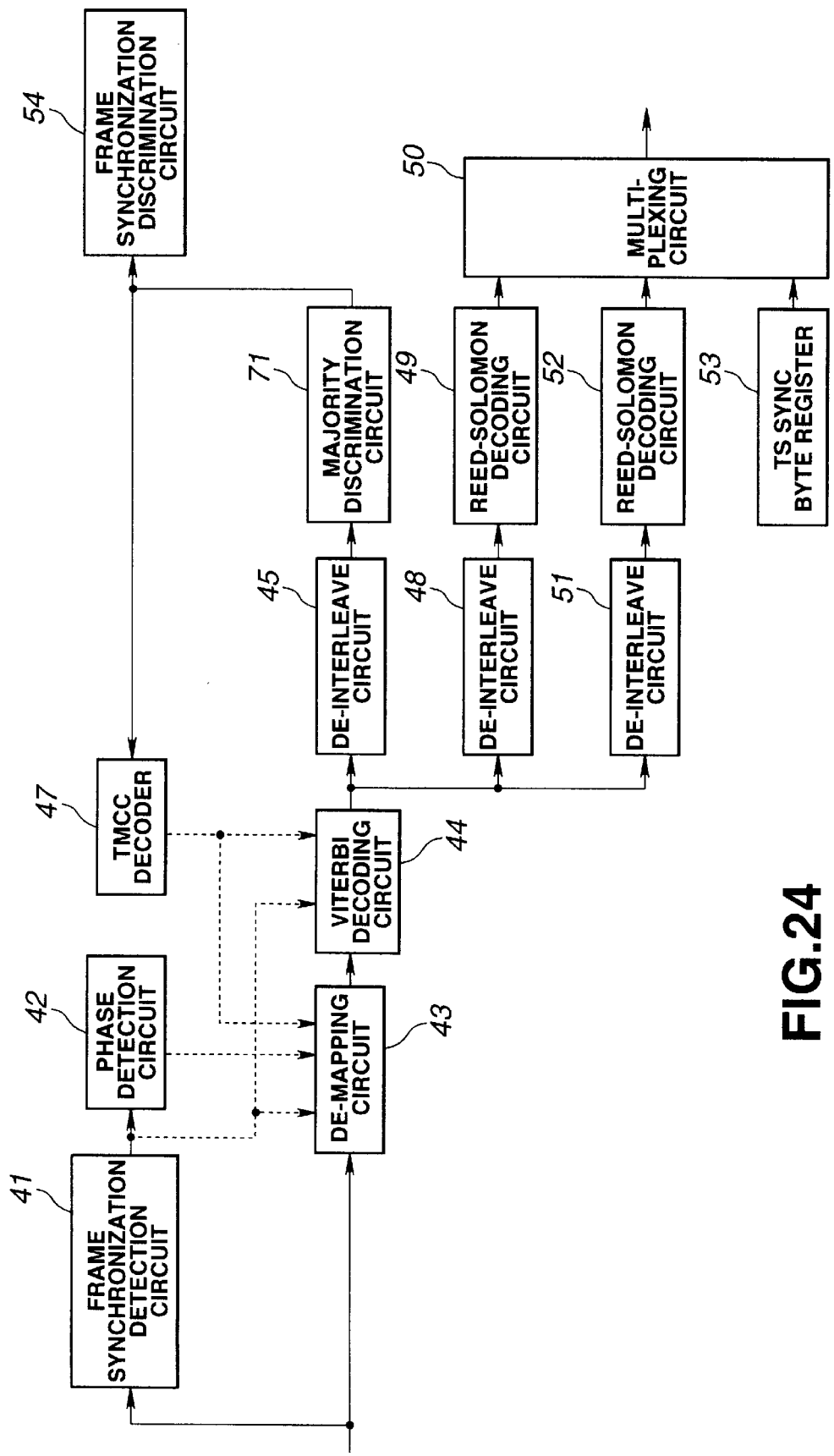
FIG. 24 is a block diagram showing another exemplary structure of a receiving device to which the present invention is applied.
Figure 25:
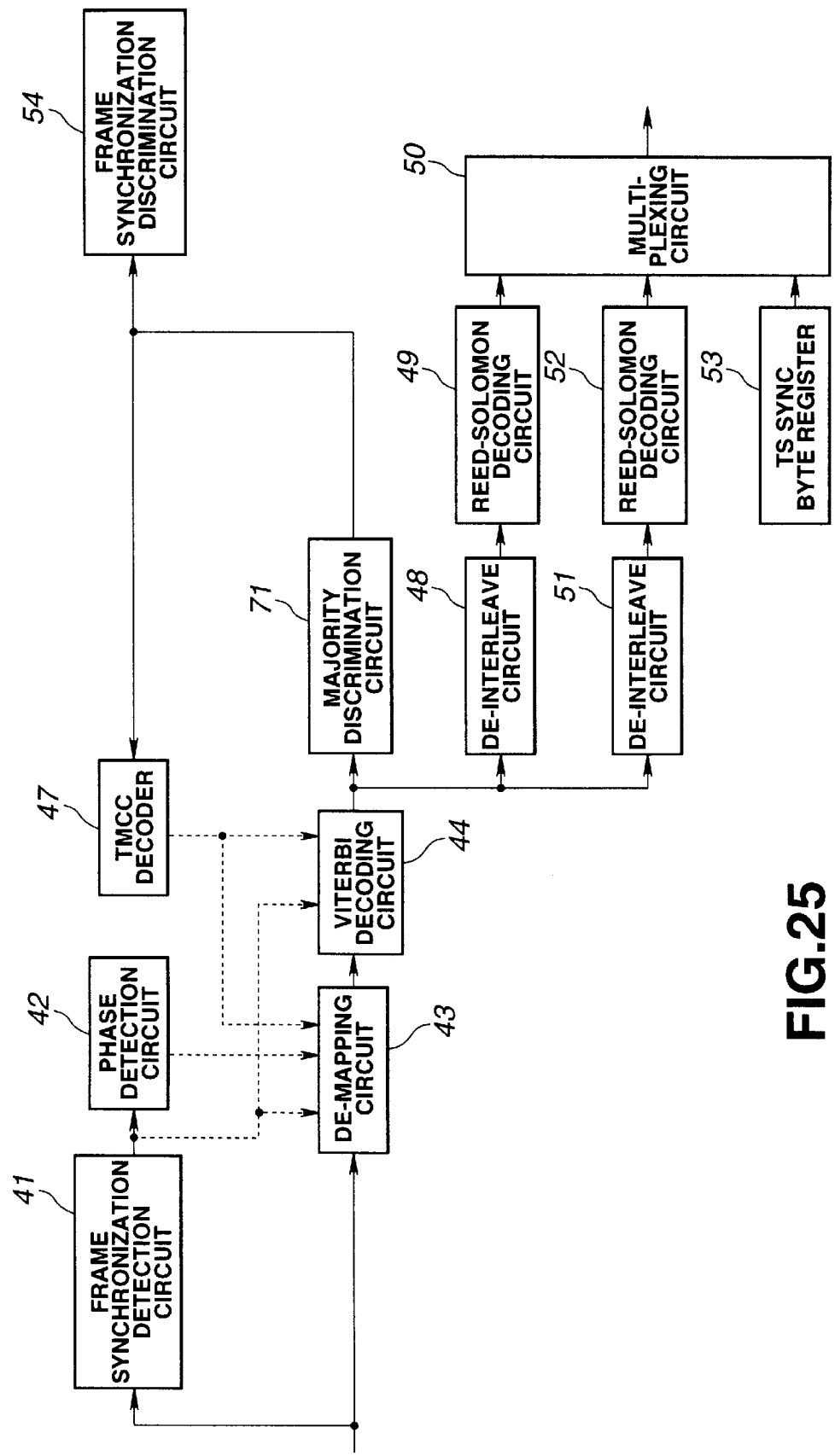
FIG. 25 is a block diagram showing still another exemplary structure of a receiving device to which the present invention is applied.

FIGS. 24 and 25 show exemplary structures of the receiving device in this case. In the embodiment of FIG. 24, the output of the de-interleave circuit 45 is inputted to a majority discrimination circuit 71, and the output of the majority discrimination circuit 71 is supplied to the TMCC recorder 47 and the frame synchronization discrimination circuit 54. That is, the Reed-Solomon decoding circuit 46 of FIG. 12 is omitted. The other parts of the structure are similar to those of FIG. 12.

In this example, the majority discrimination circuit 71 carries out error correction based on the principle of majority with respect to the RS codes interleaved by the de-interleave circuit 45. For example, when five RS codes are inputted, the data of the largest contents is assumed to be correct data.

Thus, the structure can be simplified and the device can be miniaturized in comparison with the case where the Reed-Solomon decoding circuit 46 is provided as shown in FIG. 12.

In the embodiment of FIG. 25, the de-interleave circuit 45 and the Reed-Solomon decoding circuit 46 of FIG. 12 are omitted, and a majority discrimination circuit 71 is provided instead. Specifically, the output of the Viterbi decoding circuit 44 is directly inputted to the majority discrimination circuit 71, and the output of the majority discrimination circuit 71 is supplied to the TMCC decoder and the frame synchronization discrimination circuit 54.

As described above, if the TMCC signals are the same, the RS code after being interleaved by the interleave circuit 5 is the same as the RS code before interleave. That is, it is substantially similar to the case where interleave is not carried out. Therefore, the de-interleave circuit 45 of FIG. 24 can be omitted, and the output of the Viterbi decoding circuit 44 can be directly decoded by the majority discrimination circuit 71. Thus, the structure can be further simplified and the device can be miniaturized in comparison with the case of FIG. 24.

Figure 26:
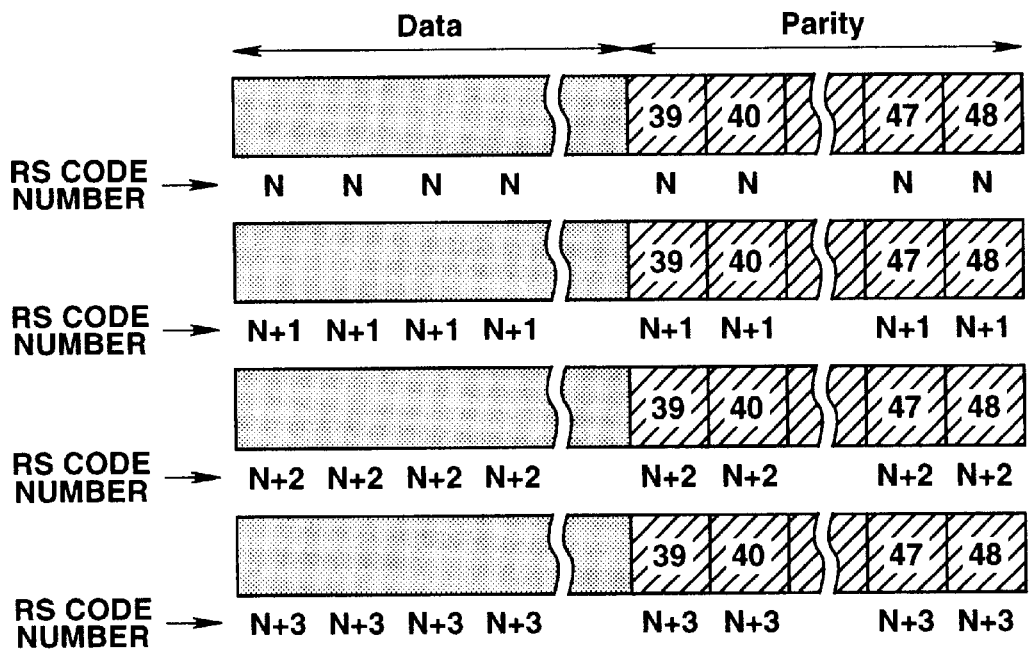
FIG. 26 illustrates input of a majority discrimination circuit 71 of FIG. 24.
Figure 27:
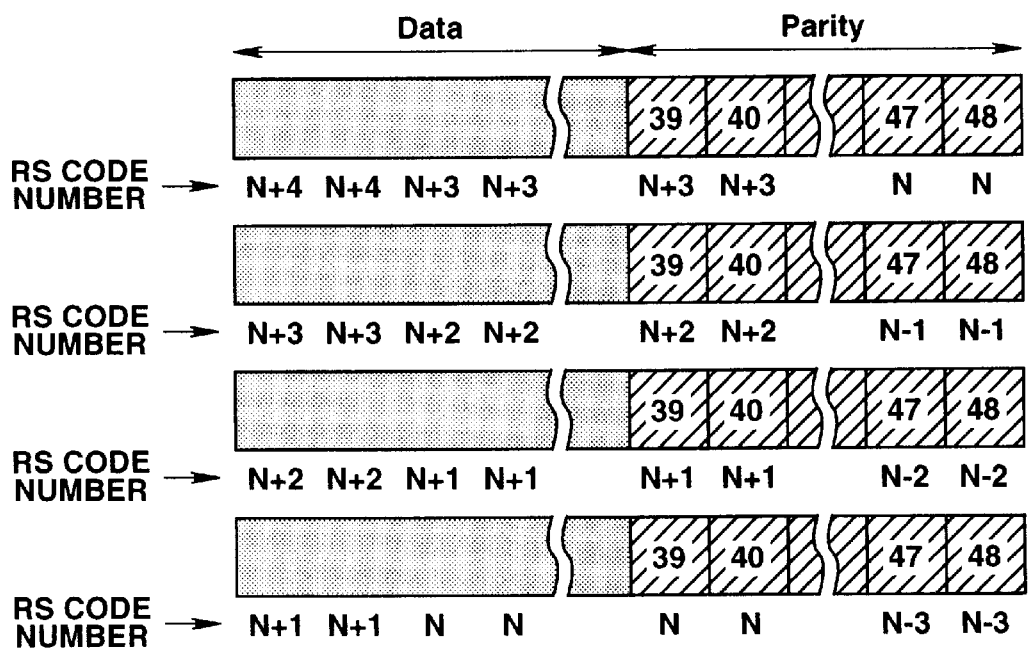
FIG. 27 illustrates input of a majority discrimination circuit 71 of FIG. 25.

In the embodiment of FIG. 24, since the de-interleave circuit 45 is provided, the input to the majority discrimination circuit 71 (i.e., the output of the de-interleave circuit 45) is as shown in FIG. 26. On the contrary, in the embodiment of FIG. 25, since the de-interleave circuit 45 is not provided, the input to the majority discrimination circuit 71 (i.e., the output of the de-interleave circuit 45) is as shown in FIG. 27. In both cases, the RS code of each number is substantially the same if the TMCC signals are the same. Therefore, discrimination based on the majority can be carried out.

Specifically, in FIG. 26 showing the case where de-interleaving is carried out on the receiving side and in FIG. 27 showing the case where de-interleaving is not carried out on the receiving side, the data portion is discriminated on the basis of the majority.

In the embodiments of FIGS. 24 and 25, since the same TMCC signals need to be iteratively transmitted, the quantity of data that can be transmitted other than the TMCC signals is reduced in comparison with the case of FIG. 12.

As transmission media for transmitting a program for carrying out the foregoing processing to the user, communication media such as network and satellite as well as recording media such as magnetic disks, CD-ROMs and solid state memories can be used.

As described above, according to the digital data transmission device, the digital data transmission method and the transmission medium of the present invention, not only main signals but also frame synchronizing signals are convolutional-coded. Thus, even in the state where the C/N ratio is low, the frame synchronizing signals can be stably and quickly detected on the receiving side.

Also, according to the digital data transmission device, the digital data transmission method and the transmission medium of the present invention, main signals and frame synchronizing signals are convolutional-decoded, and the frame synchronizing signals are detected from the signals before convolutional decoding. Thus, the frame synchronizing signals can be stably and quickly detected from the signals transmitted from a transmission line.

In addition, according to the digital data transmission device, the digital data transmission method and the transmission medium of the present invention, a specified pattern of signal is multiplexed to the forward side and the back side of a transmission control signal, and the transmission control signal and the specified pattern of signal are modulated in the second system. Thus, the transmission control signal can be securely transmitted.

Moreover, according to the digital data transmission device, the digital data transmission method and the transmission medium of the present invention, a transmission control signal and a specified pattern of signal which are transmitted are demodulated in the second system, and the demodulated transmission control signal and specified pattern of signal are Viterbi-decoded. Thus, the transmission control signal can be securely transmitted.

What is claimed is:

1. A digital data transmission device for HA coding a plurality of packets, each packet having a main signal and a packet synchronizing signal, (ii) arranging the packets to constitute a frame, and (iii) replacing each packet synchronizing signal with a frame synchronizing signal and a transmission control signal of the main signal, the device comprising:

means for generating the frame synchronizing signal of the frame;

means for supplying the main signal to be transmitted in the frame;

means for generating the transmission control signal; and means for convolutional-coding the frame synchronizing signal, the transmission control signal, and the main signal.

2. The digital data transmission device as claimed in claim 1, wherein the frame synchronizing signal is longer than a constraint length of the convolutional coding means.

3. A digital data transmission method for coding a frame formed from a plurality of packets, each packet having a main signal and a packet synchronizing signal, the method comprising:

generating a frame synchronizing signal of the frame;

supplying the main signal to be transmitted in the frame;

replacing each packet synchronizing signal with a frame synchronizing signal and a transmission control signal of the main signal; and convolutional-coding the frame synchronizing signal, the transmission control signal, and the main signal.

4. A transmission medium for transmitting a program for coding a frame formed from a plurality of packets, each packet having a main signal and a packet synchronizing signal, the program comprising the steps of:

generating a frame synchronizing signal of the frame;

supplying a main signal to be transmitted in the frame;

replacing the packet synchronizing signal with a frame synchronizing signal and a transmission control signal of the main signal; and convolutional-coding the frame synchronizing signal, the transmission control signal, and the main signal.

5. A digital data demodulation device for demodulating transmitted signals, the device comprising:

decoding means for receiving the transmitted signals. the transmitted signals being formed by (i) coding a plurality of packets, each packet having a main signal and a packet synchronizing signal, (ii) arranging the packets to constitute a frame, (iii) replacing each packet synchronizing signal with a frame synchronizing signal, and (iv) convolutional-coding the main signal and the frame synchronizing signal, the decoding means being operable for convolutional-decoding the main signal and the frame synchronizing signal; and synchronization detection means for detecting the frame synchronizing signal from the transmitted signals before convolutional decoding by the decoding means.

6. The digital data demodulation device as claimed in claim 5, wherein the synchronization detection means detects the frame synchronizing signal from data after a constraint length of the convolutional coding on a transmission side, of the frame synchronizing signal.

7. The digital data demodulation device as claimed in claim 5, further comprising phase detection means for detecting the phase of carrier waves of the main signal and the frame synchronizing signal on the basis of data after a constraint length of the convolutional coding on a transmission side, of the frame synchronizing signal.

8. The digital data demodulating device as claimed in claim 5, further comprising guard means for monitoring the frame synchronizing signal decoded by the decoding means, thereby carrying out forward alignment guard of the frame synchronizing signal after establishment of frame synchronization.

9. A digital data demodulation method for demodulating transmitted signals, the method comprising:

receiving the transmitted signals, the transmitted signals being formed by (i) coding a plurality of packets, each packet having a main signal and a packet synchronizing signal, (ii) arranging the packets to constitute a frame, (iii) replacing each packet synchronizing signal with a frame synchronizing signal, and (iv) convolutional-coding the main signal and the frame synchronizing signal;

convolutional-decoding the main signal and the frame synchronizing signal; and detecting the frame synchronizing signal from the transmitted signals before convolutional decoding at the decoding step.

10. A transmission medium for transmitting a program for demodulating transmitted signals, the program comprising the steps of:

receiving the transmitted signals, the transmitted signals being formed by (i) coding a plurality of packets, each packet having a main signal and a packet synchronizing signal, (ii) arranging the packets to constitute a frame, (iii) replacing each packet synchronizing signal with a frame synchronizing signal, and (iv) convolutional-coding the main signal and the frame synchronizing signal;

convolutional-decoding the main signal and the frame synchronizing signal which are transmitted; and detecting the frame synchronizing signal from the transmitted signals before convolutional decoding at the decoding step.

11. A digital data transmission device for coding a plurality of packets including a main signal, arranging the packets to constitute a frame, replacing a synchronizing signal of the packets by a transmission control signal of the main signal, and transmitting the signals, the device comprising:

supply means for supplying the main signal;

transmission control signal generation means for generating the transmission control signal;

specified pattern signal generation means for generating a specified pattern of signal;

multiplexing means for multiplexing the specified pattern of signal to the forward side and the back side of the transmission control signal;

convolutional coding means for convolutional-coding the main signal, the transmission control signal, and the specified pattern of signal;

first modulation means for modulating the main signal by a first system; and second modulation means for modulating the transmission control signal and the specified pattern of signal by a second system.

12. The digital data transmission device as claimed in claim 11, wherein the specified pattern of signal is longer than the number of bits which is smaller by one bit than a constraint length in the convolutional coding means.

13. The digital data transmission device as claimed in claim 12, wherein, of the specified pattern of signal, a portion corresponding to the number of bits not smaller than the constraint length in the convolutional coding means constitutes the frame synchronizing signal.

14. The digital data transmission device as claimed in claim 13, wherein the specified pattern of signal including the frame synchronizing signal is arranged on the forward side, the back side, or both sides of the transmission control signal.

15. The digital data transmission device as claimed in claim 14, wherein the specified pattern of signal arranged on the forward side or the back side of the transmission control signal indicates the position in a super frame.

16. The digital data transmission device as claimed in claim 11, wherein the second modulation means carries out modulation in a BPSK system.

17. The digital data transmission device as claimed in claim 11, wherein the specified pattern of signal on the forward side of the transmission control signal after convolutional coding is 0xD439B.

18. The digital data transmission device as claimed in claim 17, wherein the specified pattern of signal on the back side of the transmission control signal after convolutional coding is 0x0B677.

19. The digital data transmission device as claimed in claim 17, wherein the specified pattern of signal on the back side of the transmission control signal after convolutional coding is 0x578DB.

20. The digital data transmission device as claimed in claim 11, wherein the specified patterns of signals on the forward side and the back side of the transmission control signal after convolutional coding are the same code.

21. The digital data transmission device as claimed in claim 11, wherein in a first frame of the frame, a first code is used as the specified pattern of signal on the forward side of the transmission control signal after convolutional coding while a second code is used as the specified pattern of signal on the back side of the transmission control signal after convolutional coding, and wherein in a second frame, the first code is used as the specified pattern of signal on the forward side of the transmission control signal after convolutional coding while a third code is used as the specified pattern of signal on the back side of the transmission control signal after convolutional coding.

22. The digital data transmission device as claimed in claim 21, wherein the specified pattern of the first frame and the specified pattern of the second frame are cyclically repeated.

23. The digital data transmission device as claimed in claim 11, wherein the convolutional coding means for convolutional-coding the transmission control signal is separate form the convolutional coding means for convolution-coding the main signal.

24. A digital data transmission method for coding a plurality of packets including a main signal, arranging the packets to constitute a frame, replacing a synchronizing signal of the packets by a transmission control signal of the main signal, and transmitting the signals, the method comprising:

supplying the main signal;

generating the transmission control signal;

generating a specified pattern of signal;

multiplexing the specified pattern of signal to the forward side and the back side of the transmission control signal;

convolutional-coding the main signal, the transmission control signal, and the specified pattern of signal;

modulating the main signal by a first system; and modulating the transmission control signal and the specified pattern of signal by a second system.

25. A transmission medium for transmitting a program used for a digital data transmission device for coding a plurality of packets including a main signal, arranging the packets to constitute a frame, replacing a synchronizing signal of the packets by a transmission control signal of the main signal, and transmitting the signals, the program comprising the steps of:

supplying the main signal;

generating the transmission control signal; generating a specified pattern of signal;

multiplexing the specified pattern of signal to the forward side and the back side of the transmission control signal;

convolutional-coding the main signal, the transmission control signal, and the specified pattern of signal;

modulating the main signal by a first system; and modulating the transmission control signal and the specified pattern of signal by a second system.

26. A digital data demodulation device for demodulating transmitted data formed by coding a plurality of packets including a main signal, arranging the packets to constitute a frame, replacing a synchronizing signal of the packets by a transmission control signal of the main signal, and convolutional-coding the signals, the device comprising:

demodulation means for demodulating the main signal transmitted thereto by a first system and demodulating the transmission control signal and a specified pattern of signal which are transmitted thereto by a second system; and decoding means for Viterbi-decoding the main signal, the transmission control signal and the specified pattern of signal which are demodulated.

27. The digital data demodulation device as claimed in claim 26, wherein, of the specified pattern of signal, a portion corresponding to the number of bits not smaller than a constraint length at the time of convolutional coding constitutes the frame synchronizing signal, the device further comprising synchronization detection means for detecting the frame synchronizing signal from the transmitted signals before convolutional decoding by the decoding means.

28. The digital data demodulation device as claimed in claim 26, wherein the specified pattern of signal is arranged on the forward side, the back side, or both sides of the transmission control signal.

29. The digital data demodulation device as claimed in claim 28, wherein the specified pattern of signal on the forward side of the transmission control signal is 0xD439B.

30. The digital data demodulation device as claimed in claim 29, wherein the specified pattern of signal on the back side of the transmission control signal is 0x0B677.

31. The digital data demodulation device as claimed in claim 29, wherein the specified pattern of signal on the back side of the transmission control signal is 0x578DB.

32. The digital data demodulation device as claimed in claim 28, wherein the specified patterns of signals on the forward side and the back side of the transmission control signal are the same code.

33. The digital data demodulation device as claimed in claim 28, wherein in a first frame of the frame, a first code is used as the specified pattern of signal on the forward side of the transmission control signal after convolutional coding while a second code is used as the specified pattern of signal on the back side of the transmission control signal after convolutional coding, and wherein in a second frame, the first code is used as the specified pattern of signal on the forward side of the transmission control signal after convolutional coding while a third code is used as the specified pattern of signal on the back side of the transmission control signal after convolutional coding.

34. The digital data demodulation device as claimed in claim 33, wherein the specified pattern of the first frame and the specified pattern of the second frame are cyclically repeated.

35. The digital data demodulation device as claimed in claim 34, wherein the cycle of the frame is detected by using the second code and the third code.

36. The digital data demodulation device as claimed in claim 26, wherein the decoding means for Viterbi-decoding the transmission control signal is separate from the decoding means for Viterbi-decoding the main signal.

37. A digital data demodulation method for demodulating transmitted data formed by coding a plurality of packets including a main signal, arranging the packets to constitute a frame, replacing a synchronizing signal of the packets by a transmission control signal of the main signal, and convolutional-coding the signals, the method comprising:

demodulating the transmitted main signal by a first system and demodulating the transmission control signal and a specified pattern of signal which are transmitted by a second system; and Viterbi-decoding the main signal, the transmission control signal and the specified pattern of signal which are demodulated.

38. A transmission medium for transmitting a program used for a digital data demodulation device for demodulating transmitted data formed by coding a plurality of packets including a main signal, arranging the packets to constitute a frame, replacing a synchronizing signal of the packets by a transmission control signal of the main signal, and convolutional-coding the signals, the program comprising the steps of:

demodulating the transmitted main signal by a first system and demodulating the transmission control signal and a specified pattern of signal which are transmitted by a second system; and Viterbi-decoding the main signal, the transmission control signal and the specified pattern of signal which are demodulated.

39. A data transmission device for coding frames of data from a plurality of packets, each packet including packet synchronizing data and main signal data, the data transmission device comprising:

a first memory operable to store frame synchronizing data for each frame of data;

a second memory operable to store transmission control data relating to transmission parameters of the main signal data;

a multiplexing circuit operable to (i) receive the frame synchronizing data, transmission control data, and main signal data, and (ii) produce the frames of data wherein the packet synchronizing data is replaced by at least one of the frame synchronizing data and transmission control data; and a convolution coding circuit operable to receive the frames of data and produce a convolutional coded signal from: (i) at lease one of the frame synchronizing data and the transmission control data; and (ii) the main signal data.

40. A data transmission device for coding frames of data from a plurality of packets, each packet including packet synchronizing data and a main signal data, the data transmission device comprising:
- a first memory operable to store frame synchronizing data for each frame of data;
- a second memory operable to store transmission control data relating to transmission parameters of the main signal data;
- a multiplexing circuit operable to (i) receive the frame synchronizing data, transmission control data, and main signal data, and (ii) produce the frames of data such that a signal pattern is produced from the frame synchronizing data and the transmission control data; and
- a convolution coding circuit operable to receive the frames of data and produce a convolutional coded signal from the signal pattern and the main signal data.

41. The data transmission device as claimed in claim 40, further comprising a first modulator operable to modulate the main signal data in accordance with a first system protocol.

42. The data transmission device as claimed in claim 41, further comprising a second modulator operable to modulate the transmission control data and the pattern signal in accordance with a second system protocol.

43. A data demodulation device for demodulating coded frames of data which are transmitted over a communications channel, the coded frames of data being formed from: (i) a plurality of packets, each packet including packet synchronizing data and main signal data, and (ii) frame synchronizing data for each frame of data, the frames of data being formed by multiplexing the frame synchronizing data and main signal data such that the packet synchronizing data is replaced by the frame synchronizing data, and the coded frames of data being formed by convolution coding the frames of data, the data demodulation device comprising:

a synchronization detection circuit operable to detect the frame synchronizing data from the transmitted coded frames of data; and a decoding circuit operable to perform convolutional-decoding of the main signal data and the frame synchronizing data of the coded frame data after the frame synchronization data is detected.

* * * * *

UNITED STATES PATENT AND TRADEMARK OFFICE
CERTIFICATE OF CORRECTION

PATENT NO. : 6,118,825
DATED : September 12, 2000
INVENTOR(S) : Ikeda et al.

It is certified that error appears in the above-identified patent and that said Letters Patent is hereby corrected as shown below:

Column 4, line 1, "S5" should read --58--.

Column 7, line 56, "BPSK" should read --8P5K--.

Column 12, line 31, "Of" should read --of--.

Column 12, line 43, "Of" should read --of--.

Column 17, line 66, "detects" should read --detect--.

Column 18, line 35, after "which" insert --is--.

Column 19, line 5, "($\tau$ 0)" should read --($\tau \neq 0$)--.

Column 19, line 26, "($\tau$ 0)" should read --($\tau \neq 0$)--.

Column 19, line 29, "($\tau$ 0)" should read --($\tau \neq 0$)--.

Column 19, line 31, "($\tau$ 0)" should read --($\tau \neq 0$)--.

UNITED STATES PATENT AND TRADEMARK OFFICE
CERTIFICATE OF CORRECTION

PATENT NO. : 6,118,825

DATED : September 12, 2000

INVENTOR(S) : Ikeda et al.

It is certified that error appears in the above-identified patent and that said Letters Patent is hereby corrected as shown below:

Column 21, line 54, delete the second occurrence of "the".

Column 21, line 63, insert --to-- before "those".

Column 24, line 2, "HA" should read --(i)--.

Column 28, line 65, "lease" should read --least--.

Signed and Sealed this

Seventeenth Day of April, 2001

NICHOLAS P. GODICI

*Attest:*

*Attesting Officer*        *Acting Director of the United States Patent and Trademark Office*